United States Patent
Okabe et al.

(10) Patent No.: US 10,304,334 B2
(45) Date of Patent: May 28, 2019

(54) TRAVEL PLANNING DEVICE AND TRAVEL PLANNING METHOD

(71) Applicant: MITSUBISHI ELECTRIC CORPORATION, Tokyo (JP)

(72) Inventors: Ryo Okabe, Tokyo (JP); Yasuyuki Noda, Tokyo (JP); Mitsuo Shimotani, Tokyo (JP); Yoshiharu Asaga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 101 days.

(21) Appl. No.: 15/518,704

(22) PCT Filed: Jan. 16, 2015

(86) PCT No.: PCT/JP2015/051012
§ 371 (c)(1),
(2) Date: Apr. 12, 2017

(87) PCT Pub. No.: WO2016/113891
PCT Pub. Date: Jul. 21, 2016

(65) Prior Publication Data
US 2017/0236415 A1    Aug. 17, 2017

(51) Int. Cl.
G08G 1/0968    (2006.01)
G08G 1/00    (2006.01)
(Continued)

(52) U.S. Cl.
CPC ..... *G08G 1/096833* (2013.01); *B60W 30/165* (2013.01); *G01C 21/3438* (2013.01);
(Continued)

(58) Field of Classification Search
CPC .......... B60W 30/165; B60W 2250/408; G08G 1/096833; G06Q 10/047
(Continued)

(56) References Cited

U.S. PATENT DOCUMENTS 7,610,138 B2    10/2009  Takagi et al.
8,577,586 B2    11/2013  Niki et al.
(Continued)

FOREIGN PATENT DOCUMENTS

JP    10-293899 A    11/1998
JP    2003-115095 A    4/2003
(Continued)

*Primary Examiner* — Isaac G Smith
(74) *Attorney, Agent, or Firm* — Birch, Stewart, Kolasch & Birch, LLP

(57) ABSTRACT

A travel planning device includes: a subject vehicle information acquisition unit that acquires subject vehicle information including a scheduled travel route and a scheduled departure time of a subject vehicle; an other vehicle information acquisition unit that acquires other vehicle information including information by which it is possible to predict scheduled travel routes of a plurality of other vehicles and a scheduled passage time through each point on the scheduled travel routes; and a travel plan calculator that calculates a travel plan of the subject vehicle based on the subject vehicle information and the other vehicle information. The travel plan calculator divides the scheduled travel route of the subject vehicle into manual driving sections and following travel sections, and selects the leading vehicle of each following travel section from among the plurality of other vehicles for each following travel section.

16 Claims, 29 Drawing Sheets

(51) Int. Cl.
*B60W 30/165* (2012.01)
*G06Q 10/04* (2012.01)
*G06Q 50/30* (2012.01)
*G08G 1/01* (2006.01)
*G08G 1/017* (2006.01)
*G08G 1/0969* (2006.01)
*G08G 1/127* (2006.01)
*G08G 1/13* (2006.01)
*G01C 21/34* (2006.01)

(52) U.S. Cl.
CPC ........... *G06Q 10/047* (2013.01); *G06Q 50/30* (2013.01); *G08G 1/017* (2013.01); *G08G 1/0112* (2013.01); *G08G 1/0129* (2013.01); *G08G 1/0969* (2013.01); *G08G 1/096827* (2013.01); *G08G 1/096838* (2013.01); *G08G 1/096844* (2013.01); *G08G 1/127* (2013.01); *G08G 1/13* (2013.01); *G08G 1/22* (2013.01); *B60W 2550/402* (2013.01); *B60W 2550/404* (2013.01); *B60W 2550/408* (2013.01)

(58) Field of Classification Search
USPC .......................................................... 701/117
See application file for complete search history.

(56) References Cited

U.S. PATENT DOCUMENTS 9,141,112 B1 * 9/2015 Loo ....................... G05D 1/0293
9,182,764 B1 * 11/2015 Kolhouse ............... G08G 1/017

FOREIGN PATENT DOCUMENTS

| JP | 2006-209535 | A |   | 8/2006 |
| JP | 3818722 | B2 |   | 9/2006 |
| JP | 2008-3675 | A |   | 1/2008 |
| JP | 2008003675 | A | * | 1/2008 |
| JP | 2008-275500 | A |   | 11/2008 |
| JP | 2009-43090 | A |   | 2/2009 |
| JP | 2009-157790 | A |   | 7/2009 |
| JP | 2009-262755 | A |   | 11/2009 |
| JP | 2010-146428 | A |   | 7/2010 |
| JP | 2010-247758 | A |   | 11/2010 |
| JP | 2012-68722 | A |   | 4/2012 |
| JP | 2012068722 | A | * | 4/2012 |
| WO | WO 2008/018607 | A1 |   | 2/2008 |

\* cited by examiner

F I G. 1
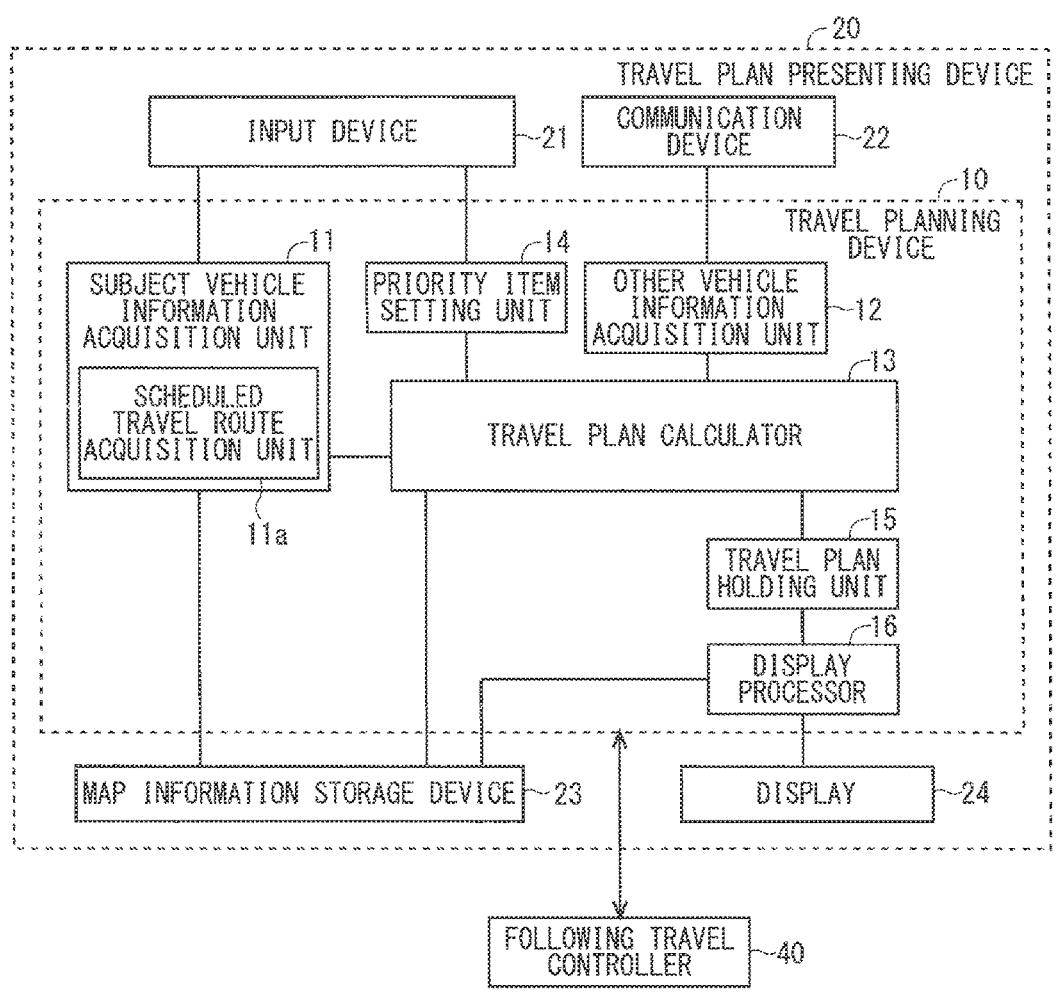

F I G. 3

| SCHEDULED DEPARTURE TIME | DEPARTURE PLACE | DESTINATION | SCHEDULED TRAVEL ROUTE | VEHICLE PERFORMANCE | LEADING VEHICLE CONDITION |
|---|---|---|---|---|---|
| 12:00 | XX PREFECTURE XX CITY XX TOWN (HOME) | YY PREFECTURE YY CITY YY TOWN | HOME → INTERSECTION A1 → INTERSECTION A2 → INTERSECTION A3 → IC A4 → JCT A5 → IC A6 → INTERSECTION A7 → DESTINATION | MAXIMUM SPEED: 180km/h OPTIMUM SPEED: 80km/h | SMALL VEHICLE IS EXCLUDED |

FIG. 4

| SCHEDULED DEPARTURE TIME | DEPARTURE PLACE | DESTINATION | SCHEDULED TRAVEL ROUTE AND SCHEDULED PASSAGE TIME | DRIVING EVALUATION | ROUTE CERTAINTY | FOLLOWING VEHICLE CONDITION |
|---|---|---|---|---|---|---|
| 12:00 | ZZ PREFECTURE ZZ CITY ZZ TOWN | WW PREFECTURE WW CITY WW TOWN | INTERSECTION B1 (11:10) → INTERSECTION B2 (12:10) → INTERSECTION B3 (12:25) → INTERSECTION B4 (13:00) → DESTINATION (14:10) | RANK A | LOW | LARGE VEHICLE IS EXCLUDED |

FIG. 33
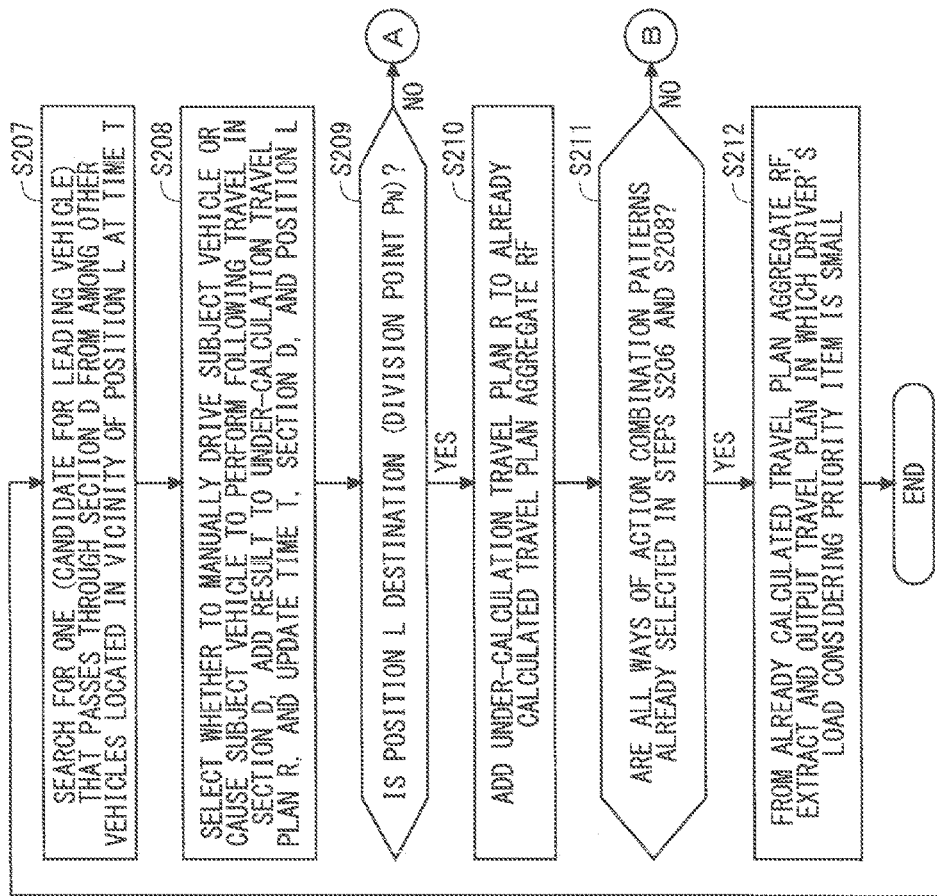
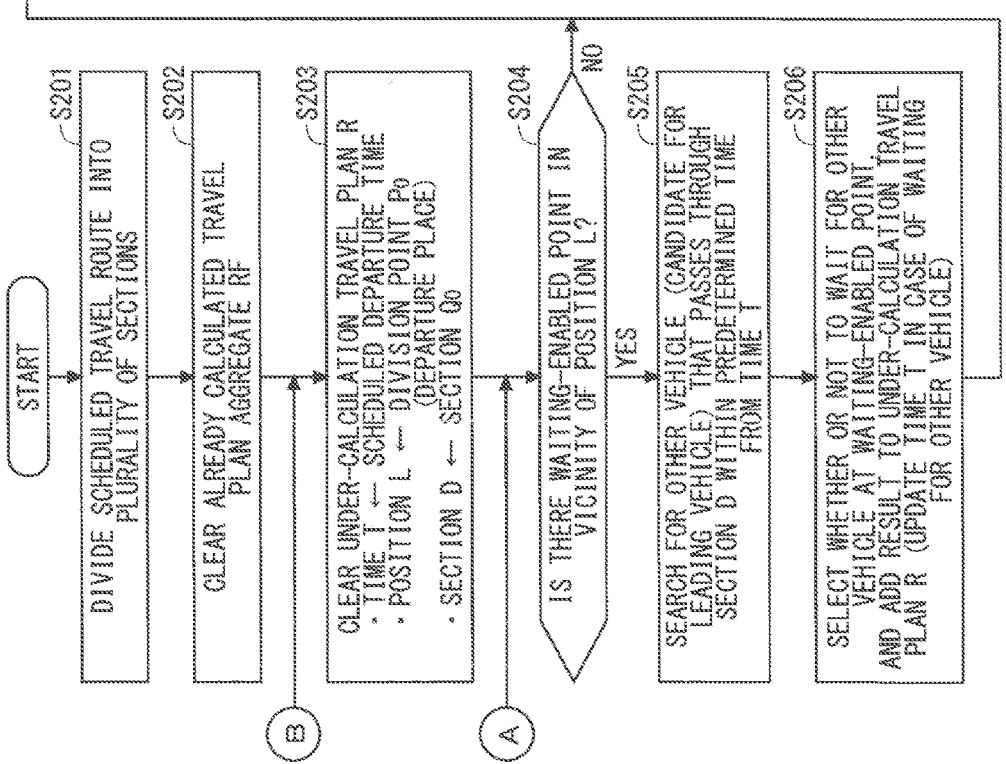

FIG. 34
[TRAVEL PLAN 1]
　FOLLOWING TRAVEL:1 TIME(CHANGE OF LEADING VEHICLE: 0 TIME),
　FOLLOWING TRAVEL DISTANCE:16km(53%),TIME REQUIRED: 53min
　(1)MANUALLY DRIVE FROM DEPARTURE PLACE TO INTERSECTION A1(4km, 6min)
　(2)FOLLOW VEHICLE X1 FROM INTERSECTION A1 TO INTERSECTION A4(16km, 32min)
　(3)MANUALLY DRIVE FROM INTERSECTION A4 TO DESTINATION(10km,15min)
FIG. 35
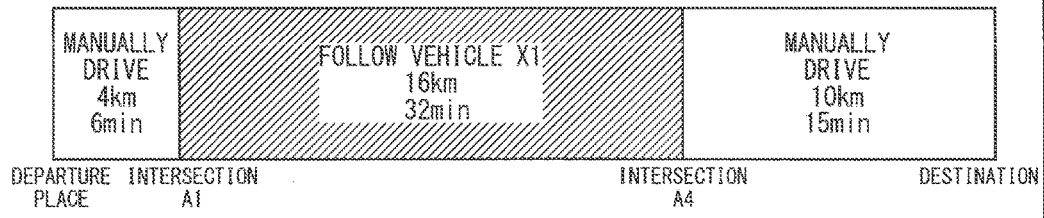
FIG. 36
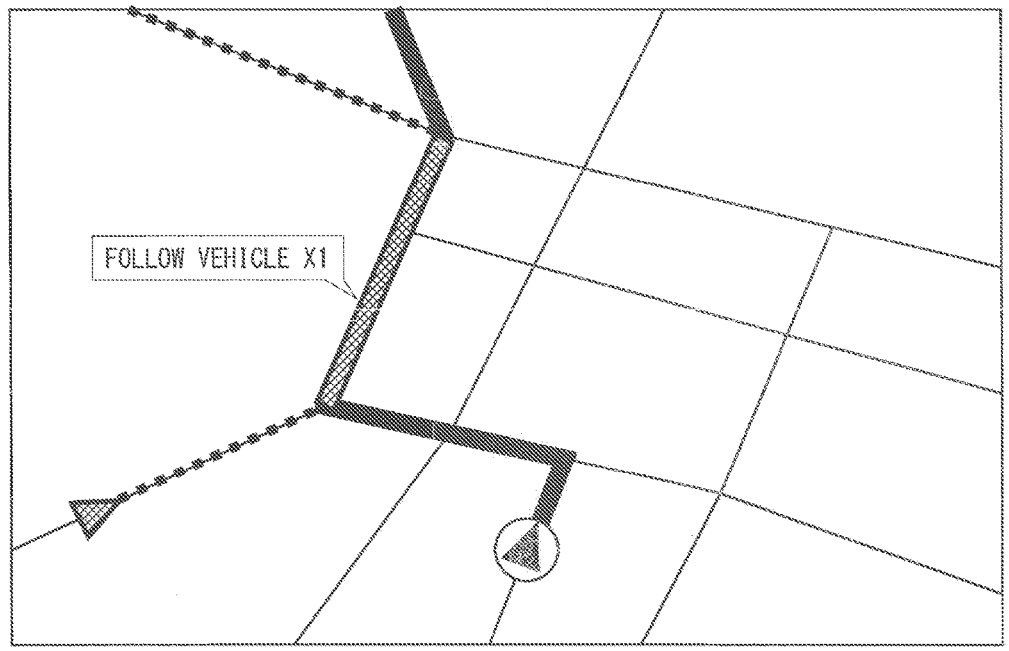

F I G . 3 9
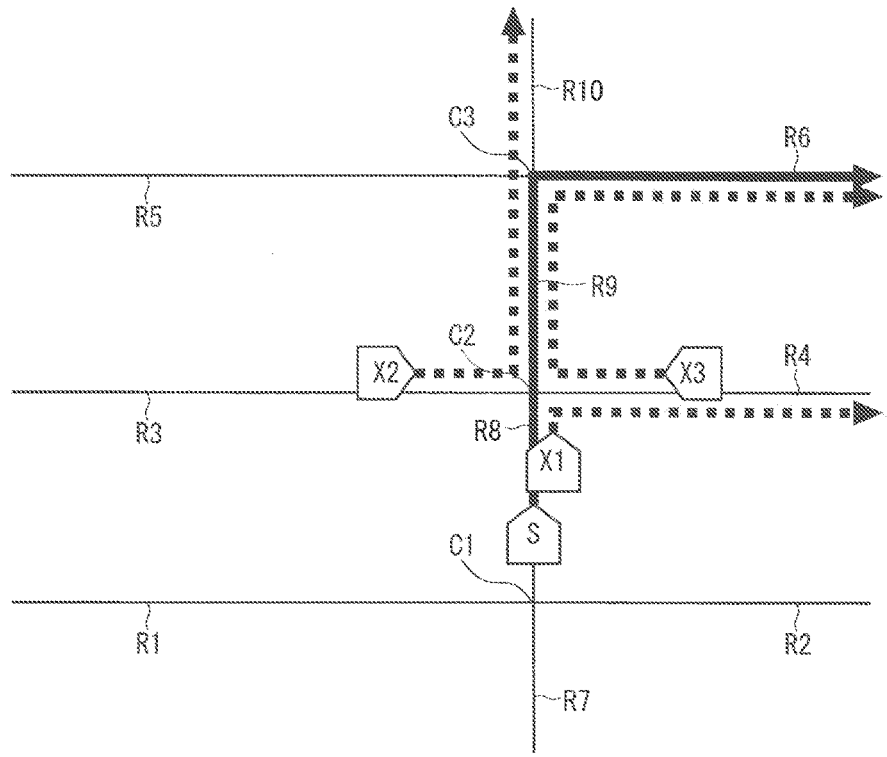
F I G . 4 0
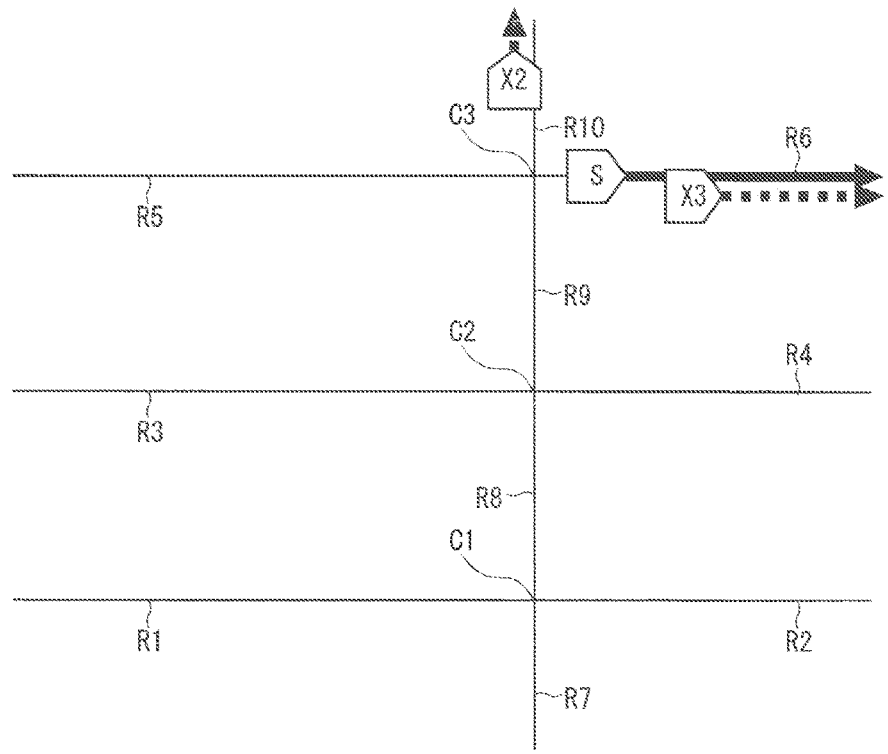

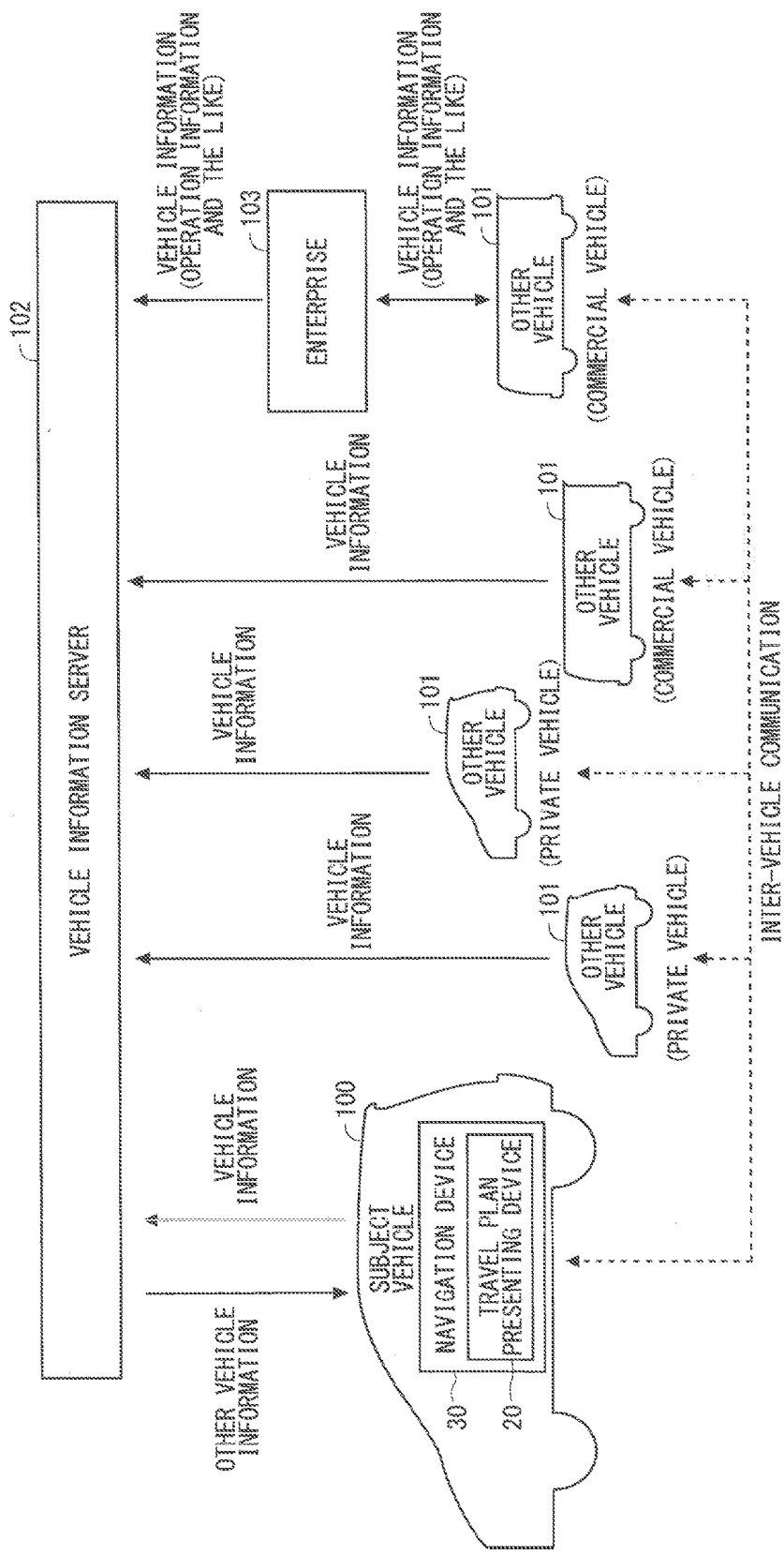

F I G. 4 8
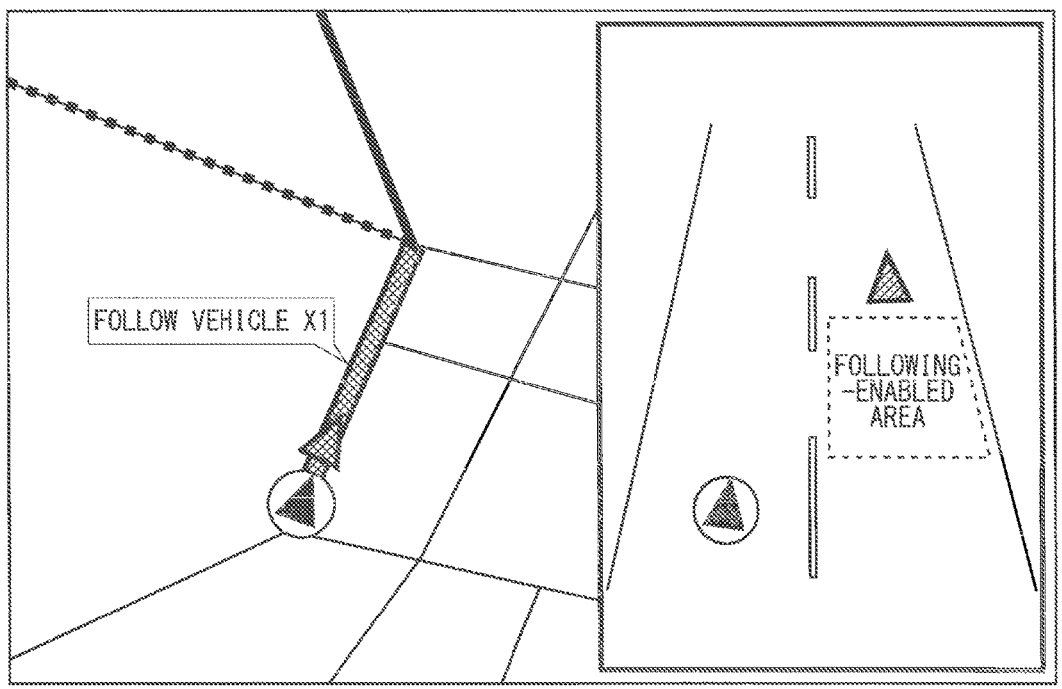

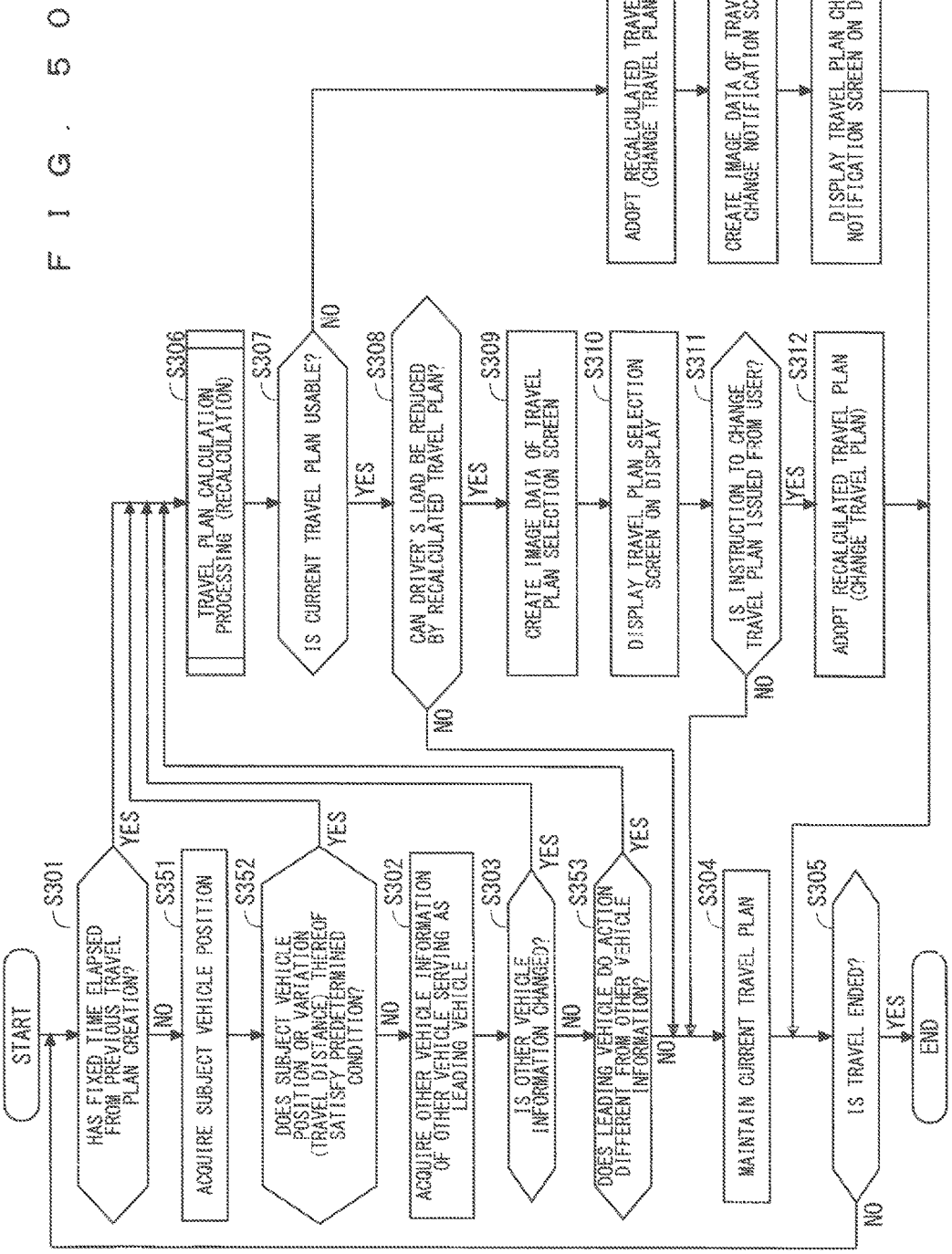

TRAVEL PLANNING DEVICE AND TRAVEL PLANNING METHOD

TECHNICAL FIELD

The present invention relates to a technology for planning a travel of a vehicle, and particularly relates to a travel plan of a vehicle having a function to travel following other vehicle.

BACKGROUND ART

In recent years, development of a vehicle that has a function to travel following other vehicle has advanced (for example, Patent Documents 1 to 9 described below). The vehicle automatically travels following the other vehicle (leading vehicle), whereby automatic driving (including semi-automatic driving such as automatic steering) of such a following-side vehicle (following vehicle) can be realized. In this way, a load on a driver of the following vehicle can be reduced, and in addition, this can also contribute to efficient operation of a traffic infrastructure.

PRIOR ART DOCUMENTS

Patent Documents

Patent Document 1: Japanese Patent Application Laid-Open No. 2009-157790
Patent Document 2: International Publication No. 2008-018607
Patent Document 3: Japanese Patent Application Laid-Open No. H10-293899 (1998)
Patent Document 4: Japanese Patent Application Laid-Open No. 2009-262755
Patent Document 5: Japanese Patent Application Laid-Open No. 2010-247758
Patent Document 6: Japanese Patent Application Laid-Open No. 2010-146428
Patent Document 7: Japanese Patent No. 3818722
Patent Document 8: Japanese Patent Application Laid-Open No. 2003-115095
Patent Document 9: Japanese Patent Application Laid-Open No. 2008-275500

SUMMARY OF INVENTION

Problems to be Solved by the Invention

Technologies of Patent documents 1 to 9 are those which consider only a leading vehicle which the following vehicle is capable of following at the present point of time, and are not those which consider future positions of the following vehicle and the leading vehicle, and accordingly, are also conceived not to be capable of sufficiently using such following travel. For example, in a case where a leading vehicle of which destination is the same as that of the following vehicle cannot be found at a point of time when the following vehicle starts to travel, then it is difficult to sufficiently extend a distance by which the following vehicle is caused to perform following travel.

Note that, in Patent Document 9, it is considered to change the leading vehicle while the following vehicle is traveling; however, the change of the leading vehicle in Patent Document 9 is performed in a case where the following vehicle becomes incapable of following the present leading vehicle, or in a case where a new route or a new leading vehicle is found, and this change is not planned so as to use a plurality of leading vehicles in consideration of future positions of the following vehicle.

The present invention has been made in order to solve such problems as described above, and it is an object of the present invention to provide a travel planning device capable of creating a highly convenient travel plan fully using the following travel.

Means for Solving the Problems

A travel planning device according to the present invention is one including: a processor that executes a program; and a storage device that stores the program, wherein, when the program is executed by the processor, the travel planning device acquires subject vehicle information including a scheduled travel route and scheduled departure time of a subject vehicle, acquires other vehicle information including information by which it is possible to predict scheduled travel routes of a plurality of other vehicles and a scheduled passage time through each point on the scheduled travel routes, divides the scheduled travel route of the subject vehicle into a plurality of sections, decides, based on the subject vehicle information and the other vehicle information, which of a manual driving section where the subject vehicle is caused to travel by manual driving and a following travel section where the subject vehicle is caused to travel following a leading vehicle each of the sections of the scheduled travel route of the subject vehicle is to be defined as, selects other vehicle, which serves as the leading vehicle in each following travel section, from among the plurality of other vehicles for each following travel section based on the subject vehicle information and the other vehicle information, and outputs a travel plan including information that indicates whether each section of the scheduled travel route of the subject vehicle is the manual driving section or the following travel section, and information that indicates the other vehicle that serves as the leading vehicle in each following travel section.

Effects of the Invention

In accordance with the travel planning device according to the present invention, the travel plan in Which the leading vehicles in the respective following travel sections are predetermined can be created in consideration of the future positions (scheduled travel route) of the subject vehicle and the other vehicles. In this case, a travel plan with a small driver's load, the travel plan making full use of the following travel, can be obtained.

Objects, features, aspects and advantages of the present invention will be more apparent by the detailed description and the accompanying drawings, which are described below.

BRIEF DESCRIPTION OF DRAWINGS

FIG. 1 is a diagram showing a configuration of a travel plan presenting device according to a first embodiment.
FIG. 3 is a table showing an example of subject vehicle information.
FIG. 4 is a table showing an example of vehicle information (other vehicle information).

FIG. 33 is a flowchart of travel plan calculation processing.

FIG. 34 is a table showing a display example of a travel plan.

FIG. 35 is a table showing a display example of the travel plan.

FIG. 36 is a diagram showing a display example of the travel plan.

FIG. 39 is a diagram showing an example of a case of recalculating the travel plan.

FIG. 40 is a diagram showing an example of the case of recalculating the travel plan.

FIG. 47 is a diagram showing a configuration of a vehicle information distribution system according to the third embodiment.

FIG. 48 is a diagram showing an example of a guide screen of the navigation device according to the third embodiment.

FIG. 50 is a flowchart showing travel plan recalculation processing in the third embodiment.

DESCRIPTION OF EMBODIMENTS

<First Embodiment>

Figure 2:
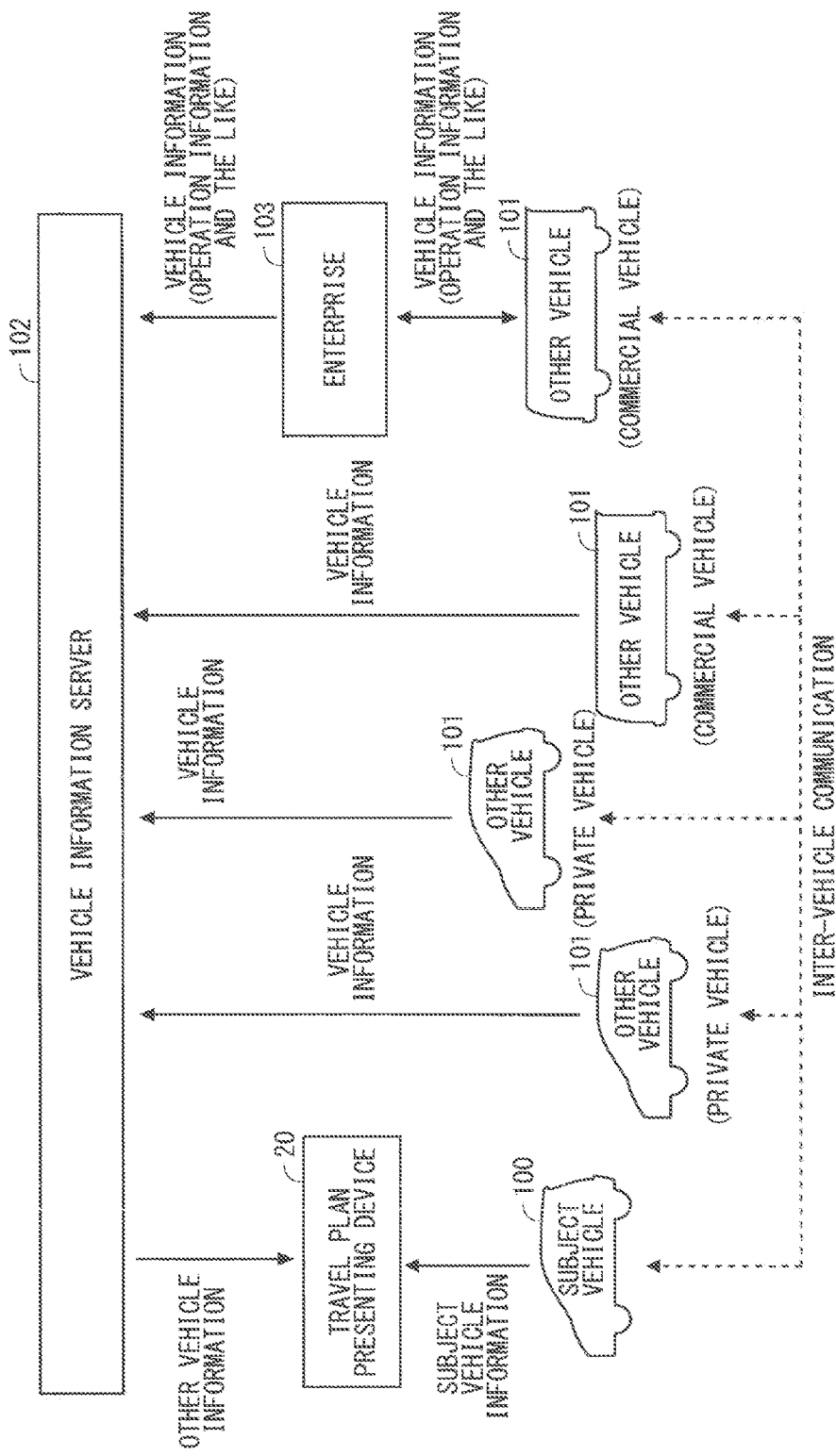
FIG. 2 is a diagram showing a configuration of a vehicle information distribution system according to the first embodiment.

FIG. 1 is a diagram showing a configuration of a travel plan presenting device 20 according to a first embodiment. Moreover, FIG. 2 is a diagram showing a vehicle information distribution system that distributes information (vehicle information) of vehicles, which travel on various places, to the travel plan presenting device 20.

The travel plan presenting device 20 is a device, which creates a travel plan of a vehicle 100 of a user (hereinafter, also referred to as "subject vehicle"), and presents the created travel plan to the user. In the first embodiment, it is assumed that the travel plan presenting device 20 is mounted on an instrument, for example, such as a cellular phone and a smart phone, which is independent of the subject vehicle 100. However, information (subject vehicle information) of the subject vehicle 100 is registered in the travel plan presenting device 20, whereby the travel plan presenting device 20 is associated with the subject vehicle 100.

The travel plan presented by the travel plan presenting device 20 includes not only a scheduled travel route of the subject vehicle 100 but also a plan of a following travel of causing the subject vehicle 100 to travel following other vehicles (hereinafter, also referred to as "other vehicles") 101. That is, in the travel plan, there are at least included: information on the scheduled travel route of the subject vehicle 100; information indicating sections (manual driving sections) in which the subject vehicle 100 is caused to travel by manual driving in the scheduled travel route; information indicating sections (following travel sections) in which the subject vehicle 100 is caused to travel following the other vehicles 101 (leading vehicles) in the scheduled travel route; and information indicating the other vehicles 101 which serve as the leading vehicles in the respective following travel sections.

As shown in FIG. 1, the travel plan presenting device 20 is configured as a system composed of: a travel planning device 10; and an input device 21, a communication device 22, a map information storage device 23 and a display 24, which operate in cooperation with the travel planning device 10.

The input device 21 is a user interface that receives an operation and information, which the user inputs to the travel planning device 10. The input device 21 may be hardware such as operation buttons and a mouse, or may be software keys which use icons displayed on a screen. Moreover, the input device 21 may be a voice recognition device to which the user inputs an operation content by voice.

In the information inputted from the input device 21, there are included: information (subject vehicle information) of the subject vehicle 100, which is necessary for the travel planning device 10 to create the travel plan; and items (priority items) to which the travel planning device 10 gives priority in a case where the travel planning device 10 creates the travel plan. Moreover, the travel planning device 10 performs communication with a following travel controller 40, and transmits a following travel instruction, which accords with the travel plan, to the following travel controller 40. The following travel controller 40 controls a control system (not shown) of the subject vehicle 100 based on the following travel instruction, and causes the subject vehicle 100 to follow such preceding vehicles to be followed. Moreover, when the subject vehicle 100 travels in the section (manual driving section) in which the manual driving is planned, the following travel controller 40 urges the subject vehicle 100 to perform a constant-speed drive, and urges the user to perform the manual driving of the subject vehicle 100. Note that the priority items are not limited to those inputted by the user, and for example, may be predetermined ones.

FIG. 3 is a table showing an example of the subject vehicle information. In the subject vehicle information, there just need to be at least included: information that makes it possible to specify the scheduled travel route from a departure place of the subject vehicle 100 to a destination thereof; and information on a scheduled departure time of the subject vehicle. In FIG. 3, furthermore, as attached information (attached subject vehicle information) of the subject vehicle information, there are allowed to be included: information on performance (vehicle performance) of the subject vehicle 100, such as a maximum speed and an optimum speed; and a condition (leading vehicle condition) of a vehicle that is permitted to lead the subject vehicle 100 when the subject vehicle 100 makes the following travel. The information on the vehicle performance is used for making the other vehicle 101, which the subject vehicle 100 is capable of following in terms of performance, as a candidate for the leading vehicle in the case where the travel planning device 10 creates the travel plan. The condition of the leading vehicle is used for making the other vehicle 101, which corresponds to user's preferences, as the candidate for the leading vehicle in the case where the travel planning device 10 creates the travel plan.

In FIG. 3, an example where "small vehicle is excluded" is set as the leading vehicle condition is shown; however, for example, the leading vehicle condition may be "vehicle inferior in vehicle performance to subject vehicle", "same travel limiting condition as that of subject vehicle", "vehicle in which travel system (engine, electric vehicle (EV), fuel cell vehicle (FCV) or the like) is same", and the like. Moreover, the leading vehicle condition may be not chosen between two alternatives which are possible and impossible, but provided with priority (for example, "small vehicle and standard-size vehicle are given priority rather than light vehicle" and the like).

Moreover, in this embodiment, a route search function is imparted to the travel planning device 10, and when the user inputs the departure place and the destination (further, a transit point) by using the input device 21, the travel planning device 10 is configured to search for an appropriate route, and to decide the scheduled travel route. An expression form of the departure place, the destination and the transit point may be address or latitude/longitude.

Moreover, the priority items are those which serve as evaluation criteria for evaluating a magnitude of a load (driver's load) applied to the driver with regard to the travel plan. In this embodiment, it is defined that, as candidates for the priority items, a plurality of items are prepared in advance, and the user selects one or more thereof as the priority items. As the priority items, there are conceived: a ratio (length of a following travel distance) of the following travel sections to an overall length of the scheduled travel route; an arrival time at the destination; a ratio (length of a following travel time) of a travel time of each of the following travel sections to a overall travel time; a number of times of changing the leading vehicles; and the like. Moreover, it is also conceived to take, as such a priority item, information (a driving evaluation value and route certainty, which are shown in FIG. 4, and the like) on the other vehicles 101 taken as the leading vehicles.

The travel planning device 10 creates the travel plan so that the driver's load, which is evaluated based on the priority item set (selected) by the user, can become minimum. Moreover, in a case where a plurality of the priority items are set, the travel planning device 10 may create such travel plans, by which the driver's load becomes minimum, for each of the priority items, and the user may select one thereof.

Returning to the explanation of FIG. 1, the communication device 22 of the travel plan presenting device 20 is one for allowing the travel planning device 10 to perform communication with a vehicle information server 102 of the vehicle information distribution system (FIG. 2). The vehicle information server 102 has already collected vehicle information transmitted by a plurality of the vehicles (other vehicles) 101 which travel on various places, and in response to a request coming from the travel planning device 10, transmits the vehicle information on the respective other vehicles 101 as other vehicle information to the travel planning device 10. At this time, the vehicle information server 102 does not necessarily have to transmit the vehicle information on all of the other vehicles 101 as the other vehicle information to the travel planning device 10, and for example, may transmit only vehicle information on the other vehicles 101 scheduled to pass through the scheduled travel route of the subject vehicle 100, or may transmit only vehicle information on the other vehicles 101 present within a certain range from the scheduled travel route of the subject vehicle 100.

In the vehicle information distribution system of this embodiment, the other vehicles 101 which are private vehicles directly transmit the vehicle information to the vehicle information server 102. However, in a case where the other vehicles 101 are commercial vehicles (fixed-route buses, highway buses, delivery vehicles, commercial leading vehicles and the like), there are also conceived: not only a mode where the other vehicles 101 directly transmit the vehicle information to the vehicle information server 102;

but also a mode where enterprises 103 to which the other vehicles 101 belong transmit the vehicle information of the other vehicles 101 to the vehicle information server 102. In that case, the vehicle information may include operation information (route maps, time tables, operation delay information and the like) of the buses, delivery information (delivery routes and delivery schedules) of the delivery vehicles, and the like.

FIG. 4 is a table showing an example of the vehicle information (other vehicle information) which the vehicle information server 102 transmits to the travel planning device 10. In the other vehicle information, there just needs to be at least included information by which it is possible to predict the scheduled travel routes of the plurality of other vehicles 101 and a scheduled passage time through each point on the scheduled travel routes. In the case where the other vehicles 101 are commercial vehicles, these pieces of the information may be those obtained from the operation information of the buses or the delivery information of the delivery vehicles.

In FIG. 4, as attached information (attached other vehicle information) of the other vehicle information, there are allowed to be further included, with regard to the other vehicle 101: a scheduled departure time; a departure place; a destination; an evaluation value (driving evaluation value) for a quality grade as the leading vehicle; certainty (route certainty) of the scheduled travel route and the scheduled passage time; and a condition (following vehicle condition) of the vehicle permitted to follow the leading vehicle when the other vehicle 101 serves as the leading vehicle. A driving evaluation is determined, for example, based on actual results (for example, a length of a travel time when the vehicle travels as the leading vehicle) as the leading vehicle, based on an evaluation from a following vehicle led in the past, and the like. The route certainty takes low values in the other vehicles 101 (mainly the private vehicles) in which the scheduled travel routes and the transit points are not required to be highly planned, and takes high values in the other vehicles 101 (mainly the commercial vehicles) in which the scheduled travel routes and the transit points are required to be highly planned.

Besides, information on expected speeds of the other vehicles 101 may be allowed to be included in the other vehicle information. In a case where the expected speeds are included in the other vehicle information, the travel planning device 10 can estimate the scheduled passage time through each point based on the scheduled travel routes and the expected speeds. In that case, the vehicle information server 102 does not necessarily have to distribute the information on the scheduled passage time through each point. On the contrary, as shown in FIG. 4, if the scheduled passage time through each point is included, then the travel planning device 10 can calculate the expected speeds of each of the other vehicles 101 based on each value of the scheduled passage time thus included.

Returning to the explanation of FIG. 1, the map information storage device 23 of the travel plan presenting device 20 is a storage medium that stores map information including data of a road network, and for example, is composed of a hard disk, a removable disk, or a memory. This map information is used when the travel planning device 10 performs the route search for deciding the scheduled travel route of the subject vehicle 100 and superimposes and displays the created travel plan on the map.

The display 24 is one for displaying the travel plan created by the travel planning device 10 and presenting the created travel plan to the user. Note that, in a case of displaying the software keys as the input device 21 on the screen of the display 24, the display 24 and the input device 21 may be composed as a single touch panel that combines functions of both thereof with each other.

Next, the configuration of the travel planning device 10 will be described. The travel planning device 10 is composed of a subject vehicle information acquisition unit 11, an other vehicle information acquisition unit 12, a travel plan calculator 13, a priority item setting unit 14, a travel plan holding unit 15 and a display processor 16.

The subject vehicle information acquisition unit 11 acquires the information (subject vehicle information) of the subject vehicle 100, which the user inputs from the input device 21. While the example of the subject vehicle information is shown in FIG. 3, in the subject vehicle information, there just need to be at least included: the information that makes it possible to specify the scheduled travel route from the departure place of the subject vehicle 100 to the destination thereof; and the information on the scheduled departure time of the subject vehicle.

In this embodiment, the subject vehicle information acquisition unit 11 has a configuration including a scheduled travel route acquisition unit 11*a* that performs the route search using the map information stored in the map information storage device 23. The scheduled travel route acquisition unit 11*a* searches for an optimum route between the departure place and destination of the subject vehicle 100, and thereby decides the scheduled travel route of the subject vehicle 100. In accordance with this configuration, the user just needs to input the information on the departure place and the destination to the input device 21 in place of the information on the scheduled travel route of the subject vehicle 100, and accordingly, convenience is enhanced.

Note that the scheduled travel route acquisition unit 11*a* may be one that acquires a scheduled travel route, which is calculated by an external navigation device, without calculating the scheduled travel route of the subject vehicle 100 by itself. Moreover, in a case where the user is capable of inputting the information on the scheduled travel route from the input device 21, the scheduled travel route acquisition unit 11*a* may be omitted.

By using the communication device 22, the other vehicle information acquisition unit 12 acquires the vehicle information (other vehicle information) of the plurality of other vehicles 101 from the vehicle information server 102. While the example of the other vehicle information is shown in FIG. 4, in the other vehicle information, there just needs to be at least included the information by which it is possible to predict the scheduled travel routes of the respective other vehicles 101 and the scheduled passage time through each point on the scheduled travel routes.

The travel plan calculator 13 creates the travel plan of the subject vehicle 100 based on the subject vehicle information and the other vehicle information. As previously mentioned, in the travel plan, there are at least included: the information on the scheduled travel route; the information indicating the manual driving section and the following travel section; and the information indicating the other vehicles 101 which serve as the leading vehicles in the respective following travel sections. Moreover, the travel plan calculator 13 selects the leading vehicles from the plurality of other vehicles 101 for each of the following travel sections.

The priority item setting unit 14 acquires the information on the priority item which the user selects by using the input device 21, and sets the selected priority item to the travel plan calculator 13.

The travel plan holding unit 15 holds the travel plan calculated by the travel plan calculator 13. The display processor 16 performs processing for displaying the travel plan, which is held in the travel plan holding unit 15, on the display 24.

Figure 5:
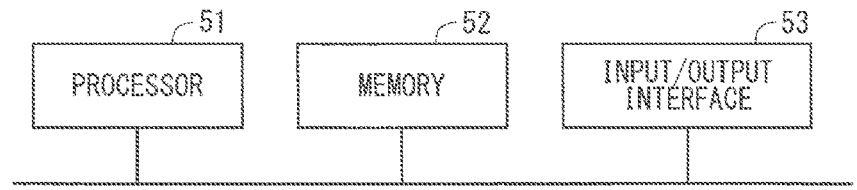
FIG. 5 is a diagram showing a hardware configuration of the travel plan presenting device according to the first embodiment.

FIG. 5 is a diagram showing a hardware configuration of the travel planning device 10 according to the first embodiment. As shown in FIG. 5, the travel planning device 10 has a configuration of at least including a processor 51, a memory 52 (a storage device) and an input/output interface 53. The subject vehicle information acquisition unit 11, the other vehicle information acquisition unit 12, the travel plan calculator 13, the priority item setting unit 14, the travel plan holding unit 15 and the display processor 16, which are described above, are realized in such a manner that the processor 51 executes a program stored in the memory 52 (a storage area as the travel plan holding unit 15 is ensured in the memory 52).

Moreover, the input device 21, the communication device 22, the map information storage device 23 and the display 24, which compose the travel plan presenting device 20, are connected to the input/output interface 53, and are controlled in such a manner that the processor 51 executes the program stored in the memory 52. In FIG. 1, there is adopted a configuration in which the input device 21, the communication device 22, the map information storage device 23 and the display 24 are attached as external devices to the travel planning device 10; however, these pieces of hardware may be disposed inside of the travel planning device 10.

Note that, in FIG. 5, the processor 51 and the memory 52, each of which is single, are shown; however, the functions of the respective elements of the travel planning device 10 may be realized in such a manner that a plurality of the processors 51 and a plurality of the memories 52 are associated with one another.

Here, a relationship between the following travel and the driver's load will be described while illustrating some examples of the following travel. In FIG. 6 to FIG. 31, a subject vehicle S corresponds to the subject vehicle 100 of FIG. 2, and each of other vehicles X1, X2 . . . corresponds to each of the other vehicles 101 of FIG. 2.

Figure 6:
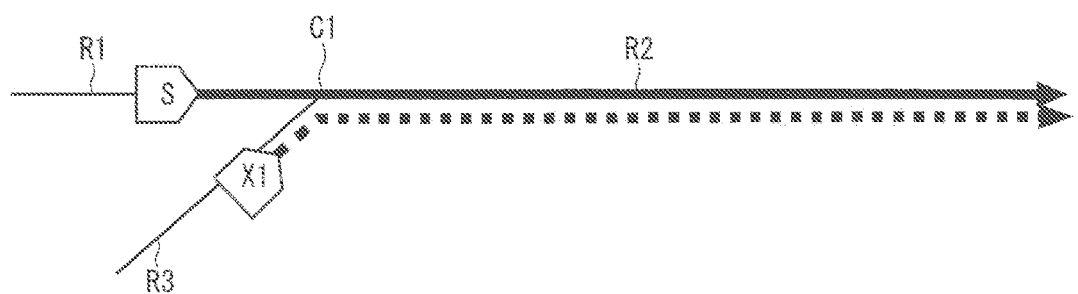
FIG. 6 is a diagram for explaining a relationship between following travel and a driver's load.
Figure 7:
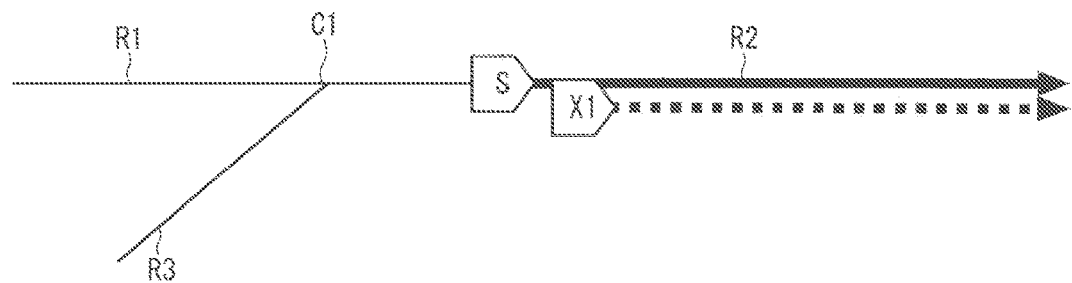
FIG. 7 is a diagram for explaining a relationship between the following travel and the driver's load.

First, there is conceived a case where, as shown in FIG. 6, the subject vehicle S scheduled to travel on roads R1 and R2 and the other vehicle X1 scheduled to travel on roads R3 and R2 reach an intersection C1 (a connection point of the roads R1, R2 and R3) at substantially the same time. After the subject vehicle S and the other vehicle X1 enter the road R2, when a driver of the subject vehicle S performs a specific operation for the subject vehicle S in a state where the subject vehicle S is made to follow the other vehicle X1 as shown in FIG. 7, then the subject vehicle S starts the following travel that takes the other vehicle X1 as the leading vehicle. In usual, the subject vehicle S is caused to perform the following travel, whereby the driver's load is reduced.

Figure 8:
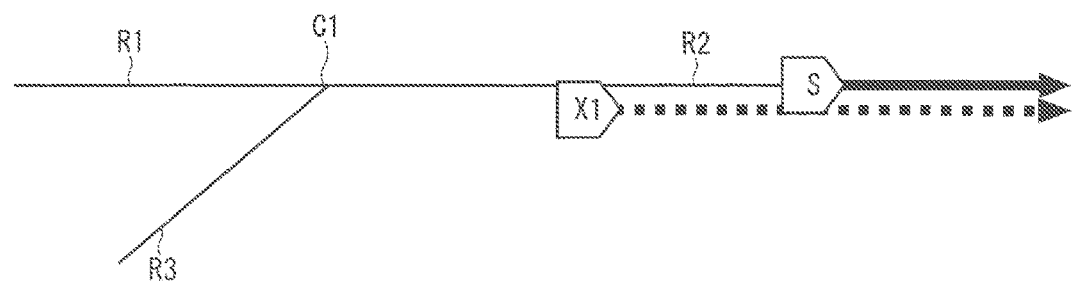
FIG. 8 is a diagram for explaining a relationship between the following travel and the driver's load.

However, for example, in a case where a speed of the other vehicle X1 is extremely slow, there is also conceived that the driver's load is rather increased from a viewpoint of a driver who regards a long-time drive as a load since the arrival time at the destination is delayed (it takes longer to travel thereto) if the subject vehicle S is caused to follow the other vehicle X1. In such a case, if the subject vehicle S is manually driven on the road R2 to shorten the travel time to the destination as shown in FIG. 8, then the driver's load is reduced more. As described above, the following travel and the driver's load are not in a constant relationship, and the relationship is changed depending on the taste of the driver.

The priority item, which the user inputs to the travel planning device 10 by using the input device 21, serves as the evaluation criterion for evaluating the driver's load based on such a driver's taste as described above. For example, if the priority item is the "length of following travel distance", then it is evaluated that the driver's load is larger in such a travel plan as in FIG. 8 than in such a travel plan as in FIG. 7, in which the following travel distance is lengthened. Moreover, if the priority item is the "arrival time at destination", then it is evaluated that the driver's load is smaller in the travel plan as in FIG. 8, in which the travel time is shortened, than in the travel plan as in FIG. 7.

Figure 9:
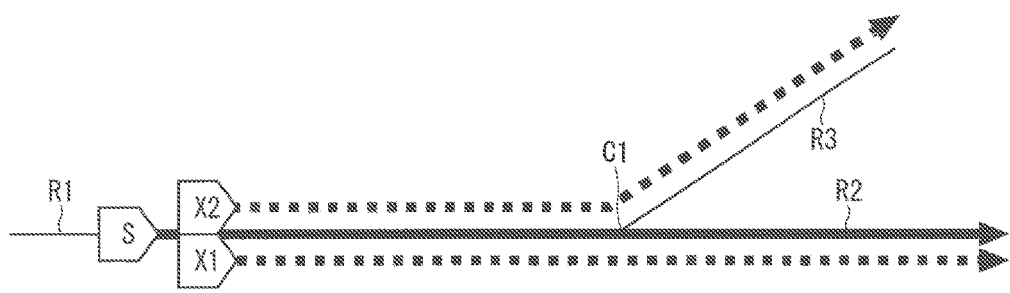
FIG. 9 is a diagram for explaining a relationship between the following travel and the driver's load.

Next, there is conceived a case where, as shown in FIG. 9, the other vehicles X1 and X2, which are two and are followable by the subject vehicle S scheduled to travel on the roads R1 and R2, are present. In this example, the other vehicle X1 is scheduled to travel on the roads R1 and R2 in the same way as the subject vehicle S, and the other vehicle X2 is scheduled to travel on the roads R1 and R3. Moreover, it is assumed that the speed of the other vehicle X1 is slower than the speed of the other vehicle X2.

Figure 10:
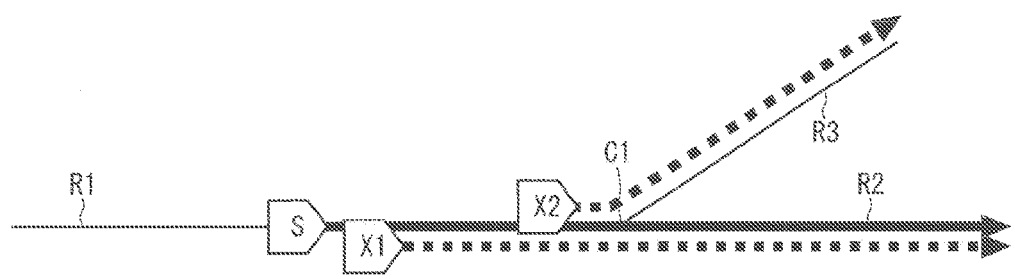
FIG. 10 is a diagram for explaining a relationship between the following travel and the driver's load.
Figure 11:
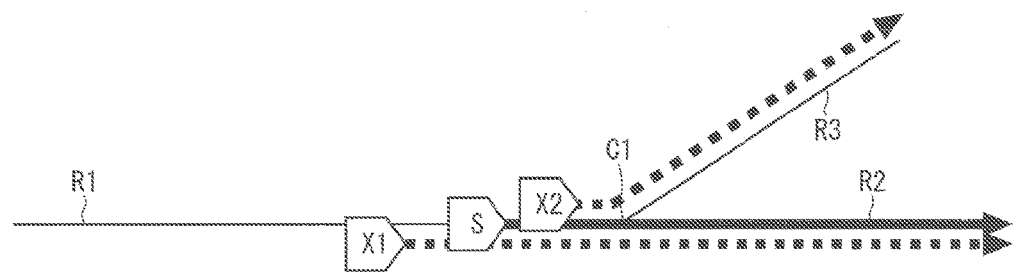
FIG. 11 is a diagram for explaining a relationship between the following travel and the driver's load.

In this case, if the subject vehicle S is caused to follow the other vehicle X1 as in FIG. 10, then the subject vehicle S can travel following the other vehicle X1 on the roads R1 and R2, and accordingly, the driver's load can be reduced in a point that the following travel distance can be lengthened; however, on the other hand, the arrival time at the destination is delayed. Moreover, if the subject vehicle S is caused to follow the other vehicle X2 as in FIG. 11, then the driver's load can be reduced in a point that the travel time can be shortened; however, the subject vehicle S can be caused to perform the following travel only to the intersection C1 (the connection point of the roads R1, R2 and R3), and accordingly, the following travel distance is shortened.

Figure 12:
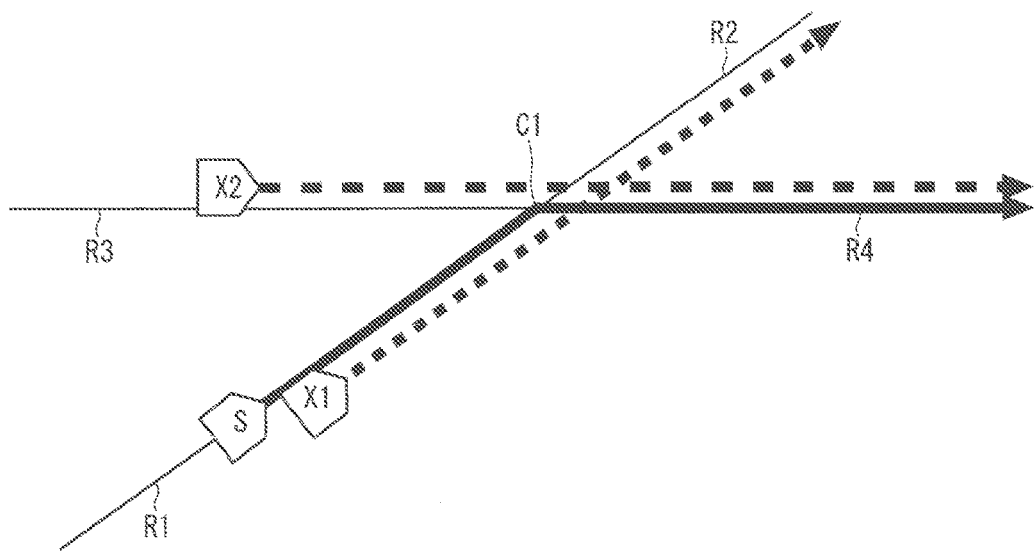
FIG. 12 is a diagram for explaining a relationship between the following travel and the driver's load.
Figure 13:
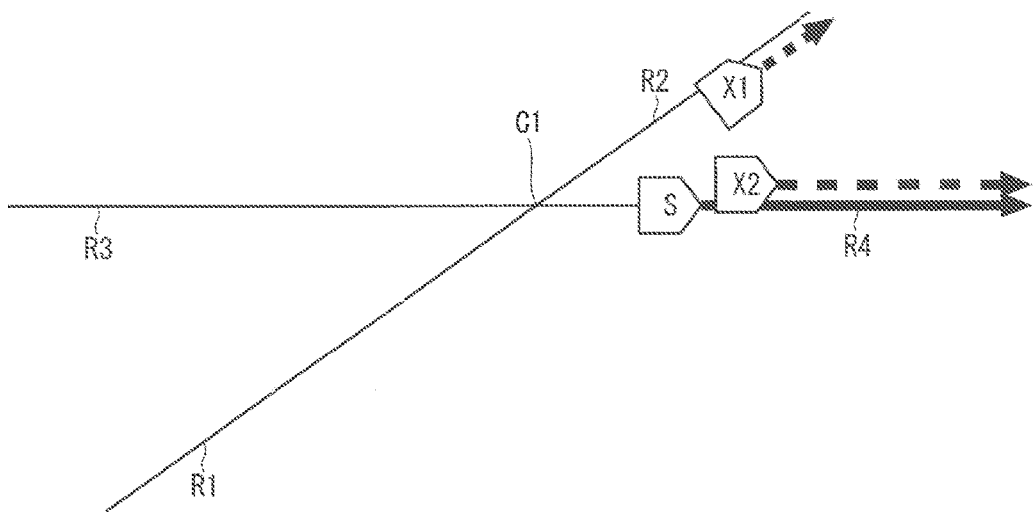
FIG. 13 is a diagram for explaining a relationship between the following travel and the driver's load.

In this embodiment, it is also assumed that the leading vehicle is changed during the following travel. For example, there is conceived a case where, as shown in FIG. 12, on the road R1, the subject vehicle S scheduled to travel on the roads R1 and R4 travels following the other vehicle X1, which is taken as the leading vehicle and is scheduled to travel on the roads R1 and R2. In this example, it is assumed that the other vehicle X2 scheduled to travel on the roads R3 and R4 is present, and that the other vehicle X1 and the other vehicle X2 reach the intersection C1 (a connection point of the roads R1 to R4) at substantially the same time. In this case, the follow of the subject vehicle S to the other vehicle X1 can be ended at the intersection C1, and thereafter, the subject vehicle S can be caused to follow the other vehicle X2 as in FIG. 13. The leading vehicles are changed as described above, whereby the following travel distance can be lengthened.

Figure 14:
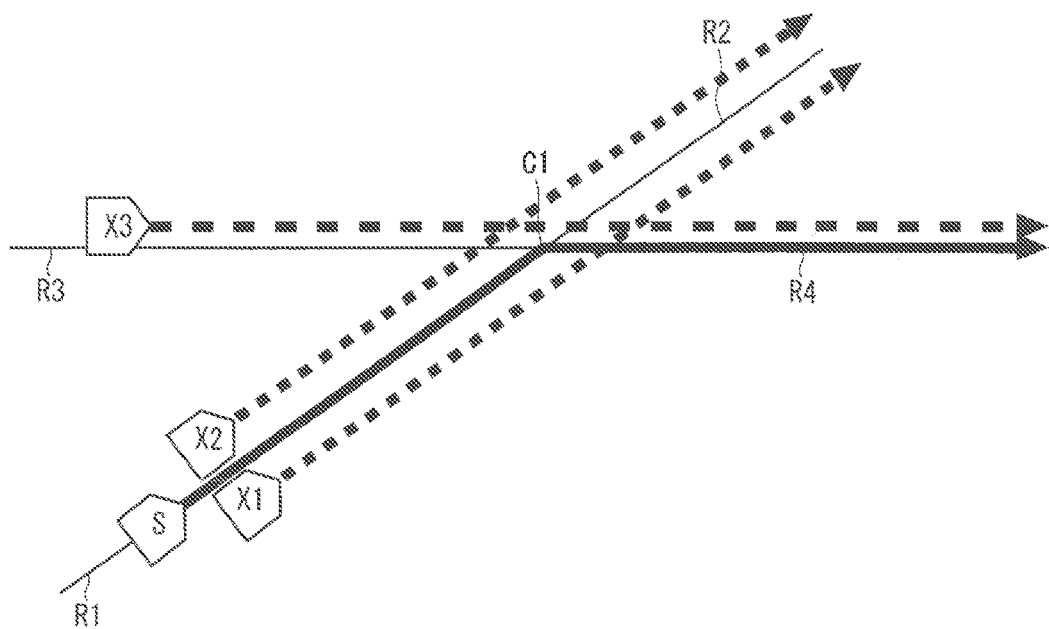
FIG. 14 is a diagram for explaining a relationship between the following travel and the driver's load.

Moreover, in this embodiment, easiness to change the leading vehicles is also taken into consideration. For example, there is considered a case where, as shown in FIG. 14, the other vehicles X1 and X2, which are two and are followable by the subject vehicle S scheduled to travel on the roads R1 and R4, are present, and both of the other vehicles X1 and X2 are scheduled travel on the roads R1 and R2. In this case, a distance by which the subject vehicle S can be caused to follow the other vehicle X1 and a distance by which the subject vehicle S can be caused to follow the other vehicle X2 are the same. However, when the change to the other vehicle X3 scheduled to travel on the roads R3 and R4 is taken into consideration, the driver's load is changed depending on which of the other vehicles X1 and X2 the subject vehicle S is caused to follow.

Figure 15:
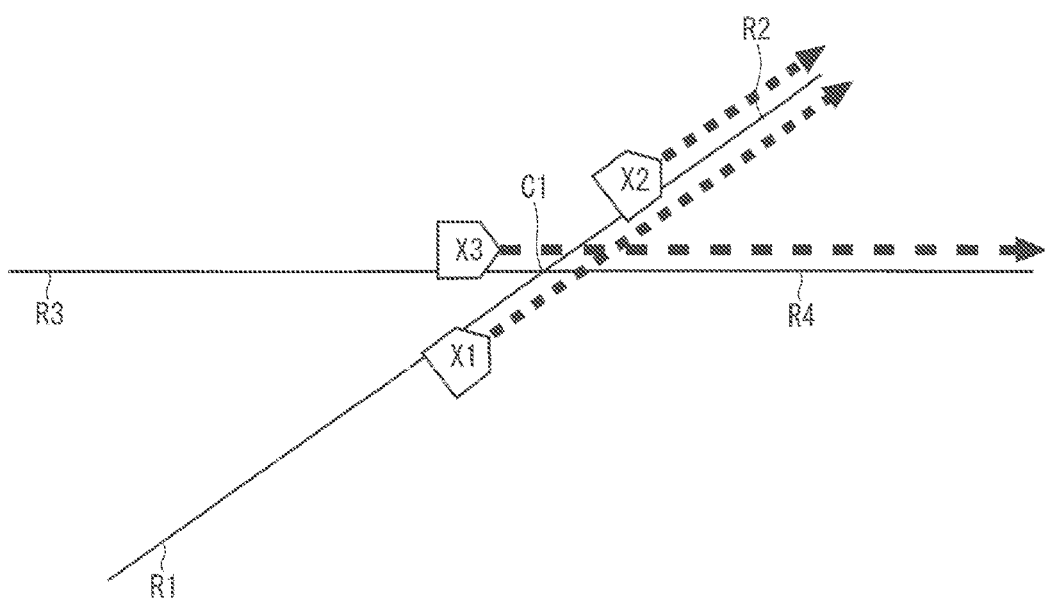
FIG. 15 is a diagram for explaining a relationship between the following travel and the driver's load.
Figure 16:
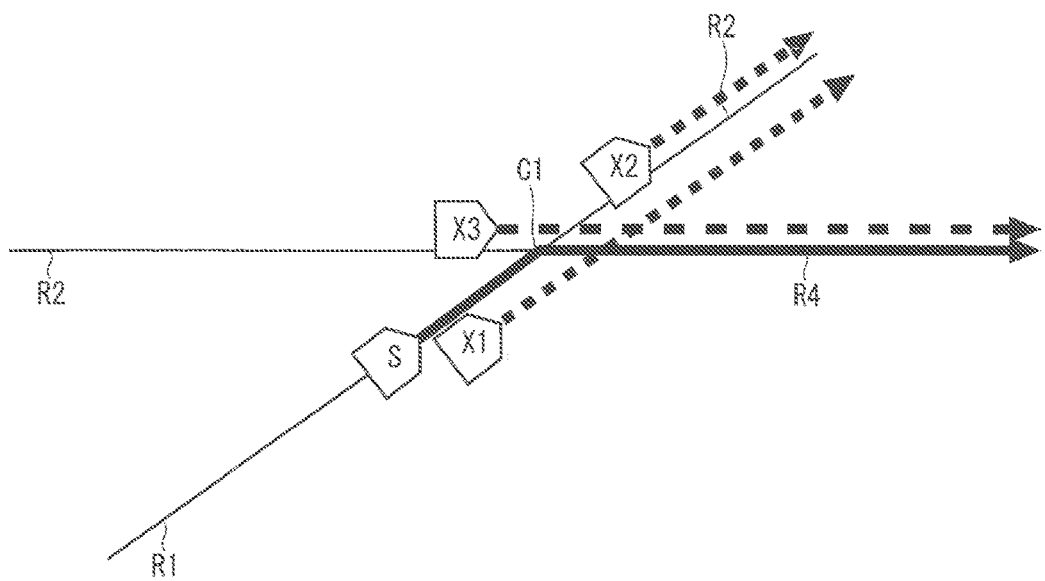
FIG. 16 is a diagram for explaining a relationship between the following travel and the driver's load.
Figure 17:
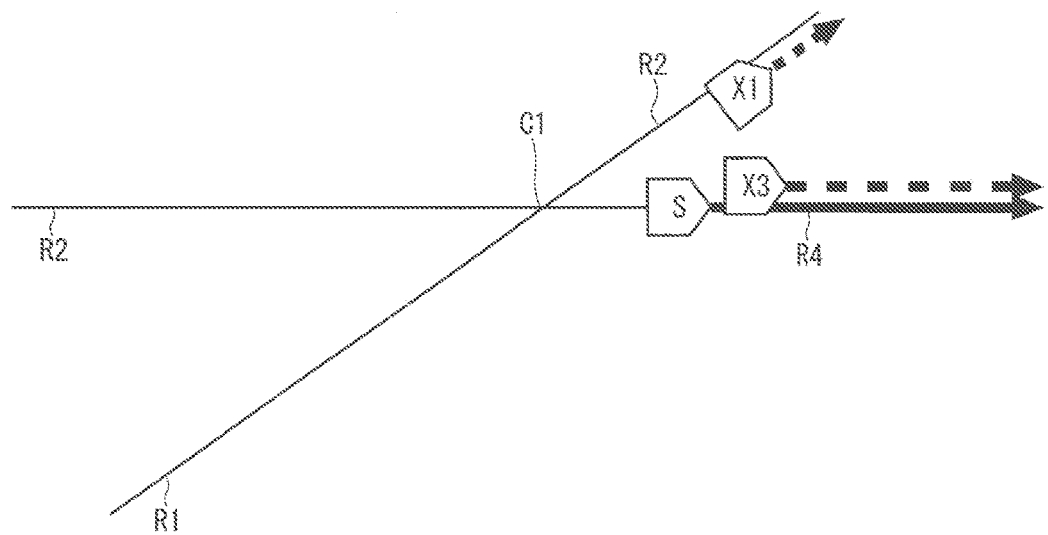
FIG. 17 is a diagram for explaining a relationship between the following travel and the driver's load.
Figure 18:
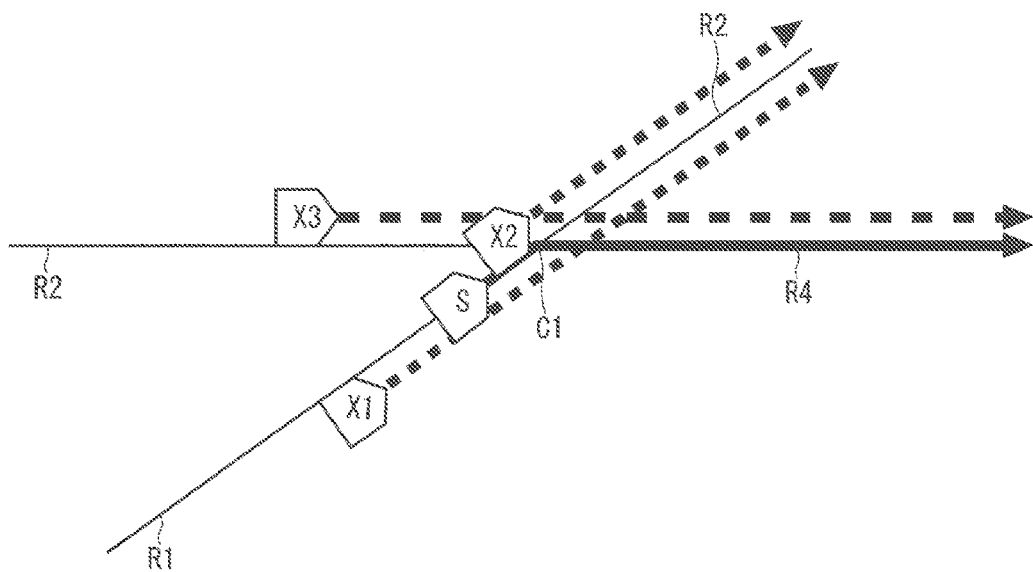
FIG. 18 is a diagram for explaining a relationship between the following travel and the driver's load.
Figure 19:
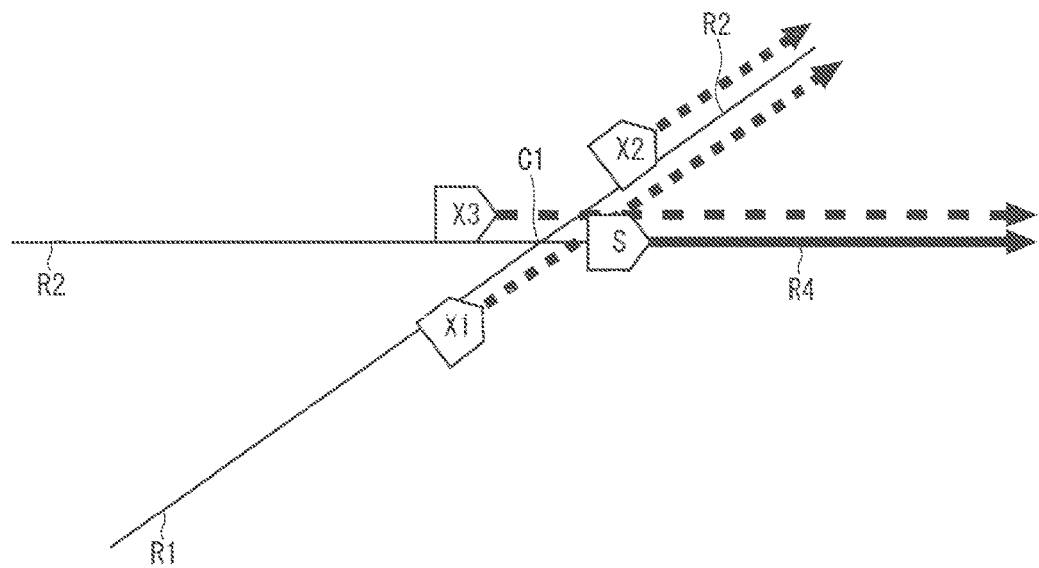
FIG. 19 is a diagram for explaining a relationship between the following travel and the driver's load.

Here, it is assumed that, as in FIG. 15 (in which the subject vehicle S is not shown), the other vehicle X1 reaches the intersection C1 (the connection point of the roads R1 to R4) at substantially the same time as the other vehicle X3, and the other vehicle X2 reaches the intersection C1 at an earlier time than the other vehicle X3. In this case, if the subject vehicle S is caused to follow the other vehicle X1 as in FIG. 16, then the change to the other vehicle X3 can be performed with ease as in FIG. 17 (the subject vehicle S cannot be caused to follow the other vehicle X3 unless the other vehicle X3 is awaited if the subject vehicle S is caused to follow the other vehicle X2), and the driver's load can be reduced.

However, if the speed of the other vehicles X1 and X3 is extremely slow, then even if the leading vehicles can be changed with ease, it is conceived that the driver's load is increased since the arrival time at the destination is delayed. In such a case, if the subject vehicle S is caused to follow the other vehicle X2 as in FIG. 18 to reach the intersection C1 early, and the subject vehicle S is manually driven on the road R4 as in FIG. 19 to shorten the travel time, then the driver's load can be reduced.

Figure 20:
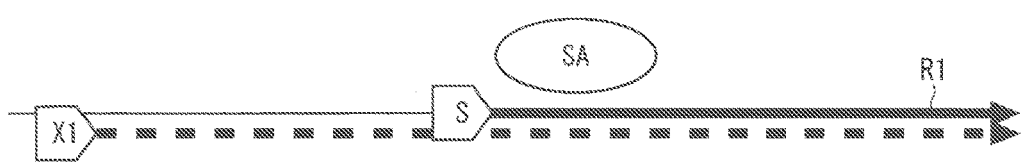
FIG. 20 is a diagram for explaining a relationship between the following travel and the driver's load.
Figure 21:
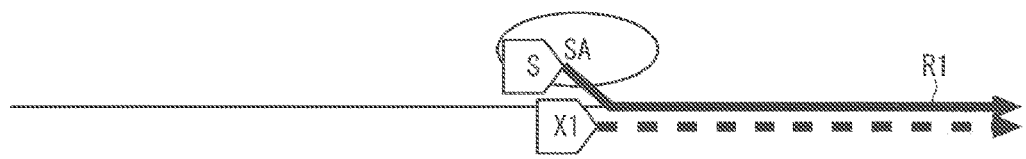
FIG. 21 is a diagram for explaining a relationship between the following travel and the driver's load.
Figure 22:
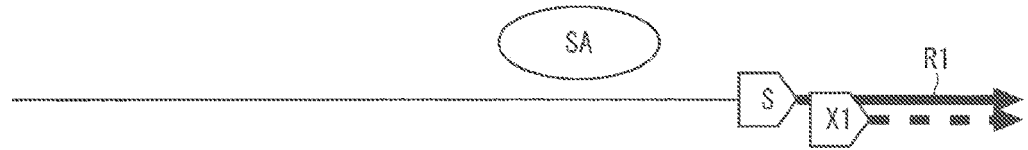
FIG. 22 is a diagram for explaining a relationship between the following travel and the driver's load.
Figure 23:
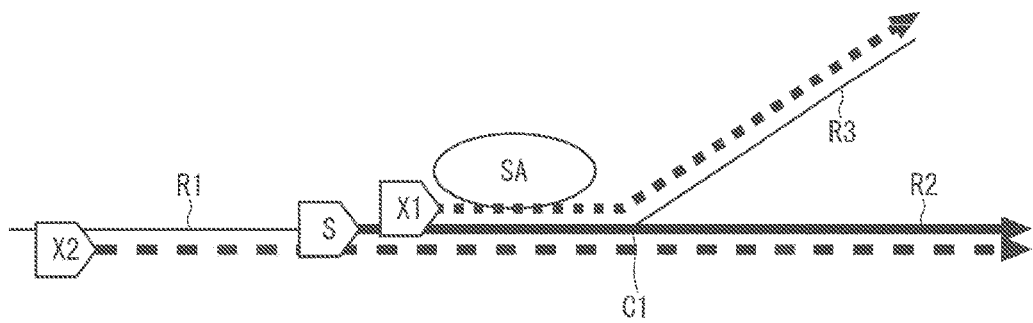
FIG. 23 is a diagram for explaining a relationship between the following travel and the driver's load.

Moreover, in the present invention, in a case where the other vehicle that can be taken as the leading vehicle is not present in the vicinity of the subject vehicle S, it is also considered to stop the subject vehicle S to make the subject vehicle S wait for the other vehicle. For example, there is conceived a case where, as shown in FIG. 20, the other vehicle X1 that will travel on the road R1 as a travel route is present behind the subject vehicle S scheduled to travel on the road R1. In this case, as in FIG. 21, if the subject vehicle S is stopped in a service area SA and waits for the other vehicle X1 to approach the subject vehicle S itself, and thereafter, the vehicle S is caused to follow the other vehicle X1 as in FIG. 22, then the subject vehicle S can be caused to perform the following travel on the road R1. The other vehicle X1 is awaited as described above, whereby the following travel distance can be lengthened, and the driver's load can be reduced (though the arrival time at the destination is delayed, an increase of the driver's load is suppressed by stopping the subject vehicle S and keeping the subject vehicle S waiting).

Figure 24:
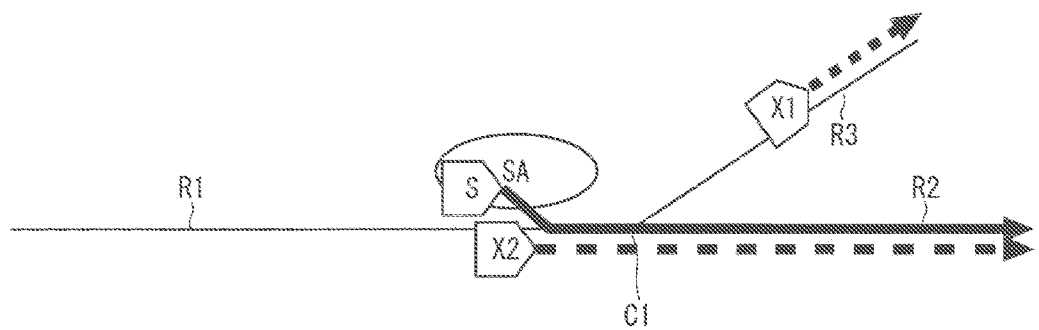
FIG. 24 is a diagram for explaining a relationship between the following travel and the driver's load.
Figure 25:
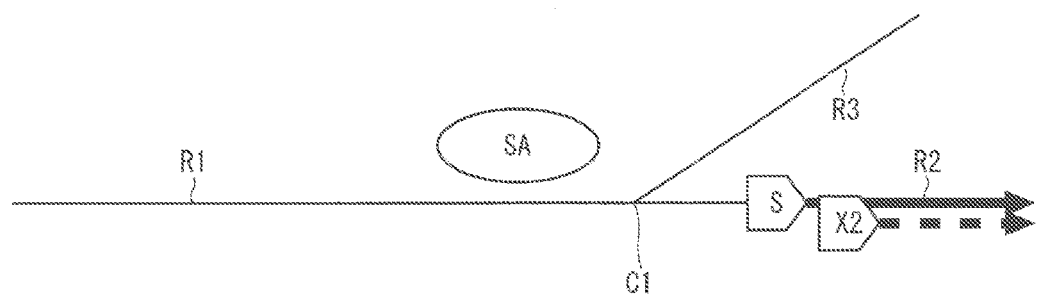
FIG. 25 is a diagram for explaining a relationship between the following travel and the driver's load.

The waiting of the subject vehicle S can also be used for the change of the leading vehicles. For example, there is conceived a case where, as in FIG. 23, the subject vehicle S scheduled to travel on the roads R1 and R2 travels following the other vehicle X1 scheduled to travel on the roads R1 and R3, and the other vehicle X2 that will travel on the roads R1 and R2 as a travel route is present behind the subject vehicle S. In this case, the follow of the subject vehicle S to the other vehicle X1 is ended before the service area SA, then as shown in FIG. 24, the subject vehicle S is stopped in the service area SA and waits for the other vehicle X2 to approach the subject vehicle S itself, and thereafter, the vehicle S is caused to follow the other vehicle X2 as in FIG. 25, then the leading vehicle can be changed from the other vehicle X1 to the other vehicle X2. As a result, the subject vehicle S can be caused to perform the following travel not only on the road R1 but also on the road R2.

In the examples described above, there is considered the presence of the other vehicles which travel on the road on which the subject vehicle S is traveling or on the road subsequent to the road concerned; however, the travel planning device 10 of this embodiment creates the travel plan of the subject vehicle 100 further in consideration of also other vehicle that travels on a road further ahead.

Figure 26:
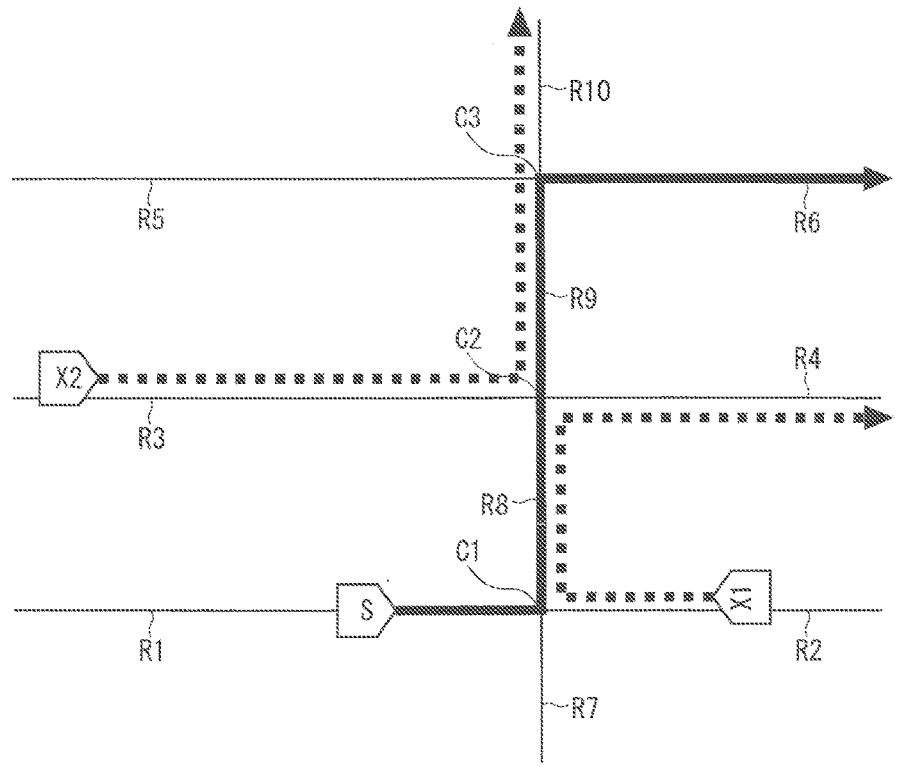
FIG. 26 is a diagram for explaining a relationship between the following travel and the driver's load.

For example, in a case where the subject vehicle S is scheduled to travel on the roads R1, R8, R9 and R6 as in FIG. 26, not only other vehicles, which travel on the road R1 on which the subject vehicle S is traveling and on the road R8 subsequent thereto, but also other vehicles, which travel on the roads R9 and R6 further ahead, are taken into consideration. For example, in a case where the priority item is set to the "length of following travel distance", then the travel plan of the subject vehicle S is created so that the subject vehicle S can be caused to follow the other vehicle X1 on the road R8 as in FIG. 27, and that the subject vehicle S can be caused to follow the other vehicle X2 on the road R9 as in FIG. 28 (that is, so that the other vehicles can be changed from the other vehicle X1 to the other vehicle X2). Note that, even if the priority item is set to the "length of the following travel distance", when it is expected that the other vehicle followable by the subject vehicle S is not present on the road R6 as in FIG. 29, such a travel plan that the subject vehicle S is manually driven on the road R6 is created.

Moreover, in the example of FIG. 26, in a case where the priority item is set to the "arrival time at destination" and the speed of the other vehicles X1 and X2 is extremely slow, a travel plan to manually drive the subject vehicle S on the road R8 without causing the subject vehicle S to follow the other vehicle X1 is created. In that case, as in FIG. 30, the subject vehicle S arrives at an intersection C2 (a connection point of the roads R3, R4, R8 and R9) prior to the other vehicle X2, and accordingly, the travel plan is created so that the subject vehicle S can be manually driven also on the roads R9 and R6 as in FIG. 31. Note that, though it is also possible to wait for the other vehicle X2 in a state of FIG. 30, this brings no sense to the fact that the travel time is shortened by manually driving the subject vehicle S on the road R8, and accordingly, such a travel plan is not preferable.

Figure 32:
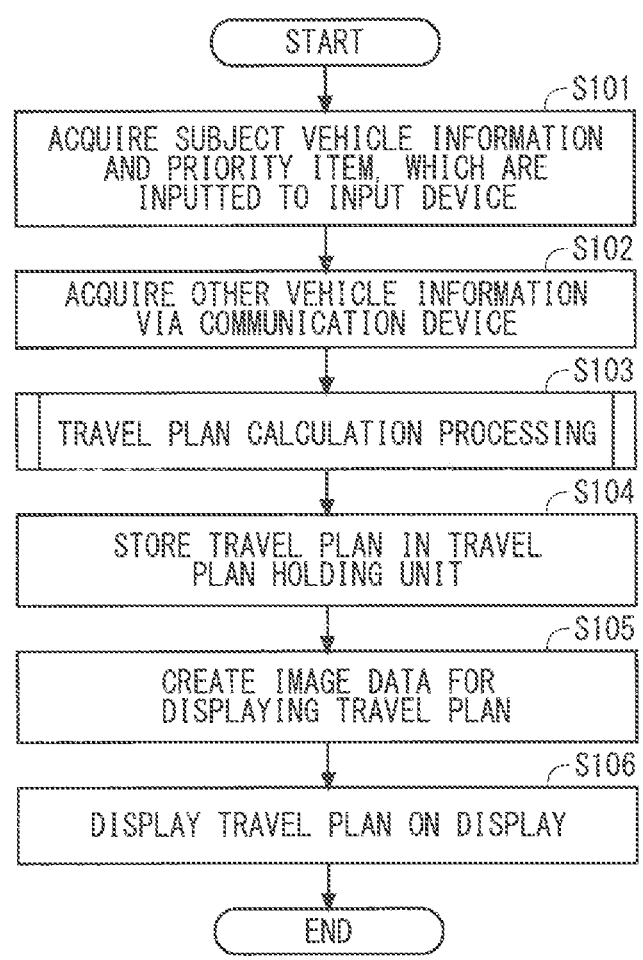
FIG. 32 is a flowchart showing operations of the travel planning device according to the first embodiment.

Next, a description will be made of operations of the travel planning device 10 according to the first embodiment. FIG. 32 is a flowchart showing the operations.

When the travel planning device 10 is started, first, the subject vehicle information acquisition unit 11 and the priority item setting unit 14 acquire the information which the user inputs from the input device 21 (Step S101). Specifically, the subject vehicle information acquisition unit 11 acquires the subject vehicle information inputted by the user, and the priority item setting unit 14 acquires the priority item selected by the user. The subject vehicle information at least includes: the information that makes it possible to specify the scheduled travel route from the departure place of the subject vehicle 100 to the destination thereof; and the information on the scheduled departure time of the subject vehicle. The subject vehicle information acquisition unit 11 of this embodiment has the scheduled travel route acquisition unit 11a, and accordingly, if the user inputs the departure place and destination of the subject vehicle 100, then the subject vehicle information acquisition unit 11 can acquire the scheduled travel route of the subject vehicle 100.

Next, the other vehicle information acquisition unit 12 acquires the other vehicle information via the communication device 22 (Step S102). In the other vehicle information, there is at least included the information by which it is possible to predict the scheduled travel routes of the plurality of other vehicles 101 and the scheduled passage time through each point on the scheduled travel routes.

Thereafter, the travel plan calculator 13 performs processing (travel plan calculation processing) for calculating the travel plan of the subject vehicle 100 (Step S103). Details of the travel plan calculation processing will be described later.

The travel plan calculated by the travel plan calculator 13 is stored in the travel plan holding unit 15 (Step S104). The display processor 16 creates image data for displaying, on the display 24, the travel plan stored in the travel plan holding unit 15 (Step S105). The image data created by the display processor 16 is inputted to the display 24, and as a result, the travel plan is displayed on the display 24 (Step S106).

Next, the travel plan calculation processing (Step S103 of FIG. 32) will be described in detail. FIG. 33 is a flowchart of the travel plan calculation processing.

When the travel plan calculation processing is started, the travel plan calculator 13 sets a plurality of division points on the scheduled travel route of the subject vehicle 100, and thereby divides the scheduled travel route into a plurality of sections (Step S201). A route between two division points adjacent to each other becomes one section, and each section serves as a unit for calculating the travel plan. A method for disposing the division points may be arbitrary. For example, there is conceived a method of defining, as each of the division points, a point having a specific attribute, such as a point (an intersection, a branch point or the like) where a plurality of roads connect to one another, and a point (a parking area, a service area, a roadside rest area, or the like) where a vehicle can stop. Moreover, the method may be a simple method of disposing the division points at every constant distance. If the scheduled travel route is finely divided (the number of division points is increased), then it becomes possible to calculate travel plans with larger number of patterns; however, a calculation amount for calculating these becomes enormous. Hence, it is recommended to decide the number of division points in response to computing power of the processor 51 as the travel plan calculator 13, and to a resolution definition required for the travel plans.

Here, it is assumed that N+1 pieces of division points $P_0$ to $P_N$, in which a start point (the departure place) of the scheduled travel route is defined as a division point $P_0$, and an end point (the destination) of the scheduled travel route is defined as a division point $P_N$, are set, and that the scheduled travel route is divided into N pieces of sections. Moreover, a section partitioned by a division point $P_i$ and a division point $P_{i+1}$ is defined as a section $Q_i$. That is, a first section is represented as $Q_0$, and a last section is represented as $Q_{N-1}$.

Next, the travel plan calculator 13 clears an "already calculated travel plan aggregate RF" that is a data aggregate in which the data of the already calculated travel plans is stocked (Step S202). The travel plan calculator 13 calculates a plurality of the travel plans with different patterns, stores these in the already calculated travel plan aggregate RF, and thereafter, extracts and outputs one among the stored travel plans, the one being adapted to the priority item selected by the user.

Next, the travel plan calculator 13 clears an "under-calculation travel plan R" that is data of the travel plan under calculation (Step S203). In a case of clearing the under-calculation travel plan R, the respective variables for use in calculating the travel plan are initialized based on the subject vehicle information. In this embodiment, there are used: a variable T that represents a time; a variable L that represents a position; and a variable D that represents a section (hereinafter, the respective variables are simply referred to as "time T", "position L" and "section D"). By the initialization, the time T is set to the scheduled departure time of the subject vehicle 100, the position L is set to the division point $P_0$ that is the departure place, and the section D is set to the section $Q_0$ that is a first section.

Next, the travel plan calculator 13 refers to the map information of the map information storage device 23, and determines whether or not there is a point (a waiting-enabled point) where the subject vehicle 100 is stopped to wait for the other vehicle 101 as the leading vehicle in a vicinity of the position L (Step S204). The "vicinity of the position L" mentioned herein just needs to be a front of the section D or a midway thereof (including the position L) (however, when the position L is the division point $P_0$, no section is present in front of the section D (section $Q_0$)). For example, a range within a fixed distance from the position L may be defined as the "vicinity of the position L", or two sections (the section D and a section immediately therebefore) which sandwich the position L therebetween may be defined as the "vicinity of the position L". Moreover, the waiting-enabled point does not have to be a point on the scheduled travel route, and a point located within a fixed range on a periphery of the scheduled travel route (for example, a range of 20 m on a periphery of the section D and the section immediately therebefore, or the like) may be defined as the waiting-enabled point. In that case, when the distance between the scheduled travel route and the waiting-enabled point is shorter, the subject vehicle can join the leading vehicle earlier, that is, can start the following travel earlier, and accordingly, the driver's load is reduced.

In a case where the waiting-enabled point is present in the vicinity of the position L, the travel plan calculator 13 searches for the other vehicle 101 that serves as a candidate for the leading vehicle for which the subject vehicle 100 is capable of waiting at the waiting-enabled point concerned. Specifically, from among the other vehicles 101 which pass through the section D within a predetermined time from the time T, the travel plan calculator 13 searches for one, which is capable of joining the subject vehicle 100 in the section D, based on the other vehicle information (Step S205).

Here, whether or not the other vehicle 101 is capable of joining the subject vehicle 100 in the section D is determined based on whether or not the other vehicle 101 can join the subject vehicle 100 within the predetermined time from when the subject vehicle 100 enters the section D (in a case where the waiting-enabled point is located at a midway point of the section D, such a determination is made based on whether or not the other vehicle 101 can join the subject vehicle 100 within the predetermined time from when the subject vehicle 100 departs from the waiting-enabled point). For example, the other vehicle 101 that travels on the section D at a speed exceeding vehicle performance of the subject vehicle 100 is incapable of joining the subject vehicle 100.

Then, the travel plan calculator 13 selects an action in the section D from two described below, and adds a content of the selected action to the under-calculation travel plan R (Step S206).

[Action 1-1] To wait for other vehicle 101, which is found in Step S205, on waiting-enabled point.
[Action 1-2] Not to wait for other vehicle 101.

Moreover, in a case where Action 1-1 is selected in Step S206, a waiting time thereof is added to the time T, whereby the time T is updated. In a case where Action 1-2 is selected in Step S206, a value of the time T is maintained.

In Step S206, either one of Action 1-1 and Action 1-2 is selected, and by processing of Step S211, which will be described later, both of such a travel plan in which Action 1-1 is selected and such a travel plan in which Action 1-2 is selected are finally created. However, in a case where the other vehicle 101 that is applicable is not found in Step S205, Action 1-1 is not selected.

In a case where a plurality of the other vehicles 101 which are applicable are found in Step S205, Action 1-1 is further divided into a plurality of alternatives, and travel plans in which the respective other vehicles 101 are awaited are created. For example, in a case where two vehicles A and B are found as the applying other vehicles 101 in Step S205, then in Step S206, one is selected from three actions described below.
[Action 1-1A] To wait for Vehicle A at waiting-enabled point.
[Action 1-1B] To wait for Vehicle B at waiting-enabled point.
[Action 1-2] Not to wait for other vehicles 101 (vehicle A, vehicle B)

Note that, in a case where a large number of the applicable other vehicles 101 are found in Step S205, targets of Action 1-1 (that is, targets to be awaited by the subject vehicle 100) may be limited to a part thereof. For example, among the plurality of applicable other vehicles 101, it is conceivable to take, as the targets, only those in which the waiting time is relatively short, and to take, as the targets, only those in which destinations are relatively close points to the destination of the subject vehicle 100. In this way, the alternatives in Step S206 are reduced, and a calculation load of the processor 51 as the travel plan calculator 13 can be reduced.

Note that the above-described processing of Steps S205 and S206 is not performed in a case where no waiting-enabled point is present in the vicinity of the position L (NO in Step S204).

Next, the travel plan calculator 13 searches for the other vehicle 101 that serves as the candidate for the leading vehicle for the subject vehicle 100 in the section D. Specifically, based on the other vehicle information, from among the other vehicles 101 which are present in the vicinity of the position L at the time T, the travel plan calculator 13 searches for one, which passes through the section D, and which the subject vehicle 100 is capable of joining in the section D (Step S207). Also here, whether or not the other vehicle 101 is capable of joining the subject vehicle 100 in the section D is determined whether or not the other vehicle 101 can join the subject vehicle 100 within the predetermined time from when the subject vehicle 100 enters the section D.

In Step S207, in a case where an item regarding the other vehicle 101 taken as the leading vehicle is included in the priority item selected by the user, only the other vehicles 101 suitable for the priority item may be taken as such search targets. For example, in a case where the driving evaluation value and route certainty of the other vehicle 101 are selected as such priority items, only the other vehicles 101 in which these are at fixed levels or more are taken as the search targets.

Moreover, in Step S207, in a case where a difference between the time T and a current time is larger than a predetermined threshold value (that is, in a case where the time T indicates a time after an elapse of a long time from the current time), it is preferable to take only the other vehicles 101 with high route certainty as the search targets. This is because, after the elapse of a long time, it is highly possible that the scheduled travel routes and scheduled passage time of the other vehicles 101 with low route certainty may be changed. Moreover, it is preferable to take, as the search targets, only the other vehicles 101 having vehicle performance equivalent to or less than that of the subject vehicle 100. This is because there is a case where it is difficult to cause the subject vehicle 100 to travel following the other vehicle 101 with higher vehicle performance than that of the subject vehicle 100.

Thereafter, the travel plan calculator 13 selects the action in the section D from two described below, and adds a content thereof to the under-calculation travel plan R (Step S208).
[Action 2-1] To cause subject vehicle 100 to travel following other vehicle 101 found in Step S207.
[Action 2-2] To manually drive subject vehicle 100.

In a case where Action 2-1 is selected, the section D is determined as the following travel section, and information for specifying the other vehicle 101 serving as the leading vehicle in the section D (for example, a vehicle body number, a registration ID to the vehicle information distribution system, and the like) is added to the under-calculation travel plan R. Then, a travel time on the section D, which is calculated from the expected speed of the other vehicle 101 as the leading vehicle is added to the time T, whereby the time T is updated. Moreover, the position L is set to a next division point, whereby the position L is updated. Furthermore, the section D is set to a next section (a section in which the updated position L is taken as a start point), whereby the section D is updated. Note that, in a case where the same other vehicle 101 is selected as the leading vehicle in continuous sections, a travel plan in which the leading vehicle is not changed is adopted in these sections.

In a case where Action 2-2 is selected, the section D is taken as a manual driving section. In that case, a travel time on the section D, which is calculated based on the speed of the subject vehicle 100, is added to the time T, whereby the time T is updated. Moreover, the position L is set to the next division point, whereby the position L is updated. Furthermore, the section D is set to the next section (the section in which the updated position L is taken as the start point), whereby the section D is updated.

In Step S208, either one of Action 2-1 and Action 2-2 is selected, and by the processing of Step S211, which will be descried later, both of such a travel plan in which Action 2-1 is selected and such a travel plan in which Action 2-2 is selected are finally created. However, in a case where the other vehicle 101 that is applicable is not found in Step S207, Action 2-1 is not selected in Step S208.

In a case where a plurality of the other vehicles 101 which are applicable are found in Step S207, Action 2-1 is further divided into a plurality of alternatives, and travel plans in which the subject vehicle 100 is caused to follow the respective other vehicles 101 are created. For example, in a case where two vehicles A and B are found as the applicable other vehicles 101 in Step S207, then one is selected from three actions described below.
[Action 2-1A] To cause subject vehicle 100 to travel following vehicle A.
[Action 2-1B] To cause subject vehicle 100 to travel following vehicle B.
[Action 2-2] To manually drive subject vehicle 100.

Moreover, in a case where a large number of the applicable other vehicles 101 are found in Step S207, targets of Action 2-1 (that is, targets to be followed by the subject vehicle 100) may be limited to a part thereof in response to the priority item. For example, only the other vehicles 101 which take, as the destinations thereof, points relatively close to the destination of the subject vehicle 100 may be taken as the targets. In this way, the alternatives in Step S208 are reduced, and the calculation load of the processor 51 as the travel plan calculator 13 can be reduced.

Next, the travel plan calculator 13 confirms whether or not the updated position L is the destination (the division point $P_N$) (Step S209). In a case where the position L is not the destination, that is, in a case where the position L is a midway position of the scheduled travel route (NO in Step S209), the processing returns to Step S204 in order to calculate a travel plan of a section that starts from the position L (that is, the updated section D).

In a case where the position L is the destination (the end point of the scheduled travel route) (YES in Step S209), a travel plan of a whole of the scheduled travel route is stored in the under-calculation travel plan R, and accordingly, this is added to the already calculated travel plan aggregate RF (Step S210). Then, it is determined whether or not all ways of combination patterns (action combination patterns) of actions selectable in Step S206 and Step S208 are selected (whether or not all of the travel plans corresponding to the respective action combination patterns are created) (Step S211).

In a case where non-selected action combination patterns are present (NO in step S211), the processing returns to Step S203 in order to create travel plans corresponding to these action combination patterns. In a second loop and after, completely the same ones as the previously selected action combination patterns are prevented from being selected.

When all ways of the action combination patterns are already selected (YES in Step S211), all of the travel plans corresponding to the respective action combination patterns are stored in the already calculated travel plan aggregate RF. In this case, from the already calculated travel plan aggregate RF, a travel plan determined that the driver's load thereof is small is extracted and outputted (Step S212). At this time, the driver's load of the respective travel plans are evaluated in consideration of the priority item.

For example, in a case where the priority item is the "length of following travel distance", such a travel plan in which the ratio of the following travel section to the overall length of the scheduled travel route is larger is determined that the driver's load thereof is smaller. Moreover, in a case where the priority item is the "arrival time at destination", such a travel plan in which the estimated arrival time at the destination is earlier is determined that the driver's load thereof is smaller. In a case where the priority item is the "length of following travel time", such a travel plan in which the ratio of travel time of the following travel section to the overall travel time is larger is determined that the driver's load thereof is smaller. In a case where the priority item is the "number of times of changing leading vehicles" such a travel plan in which the number of times of changing the leading vehicle is smaller is detennined that the driver's load is smaller.

Moreover, for example, in a case where the priority item is the "driving evaluation value", such a travel plan in which an average value of the driving evaluation values of the other vehicles 101 serving as the leading vehicles is higher is determined that the driver's load is smaller. Moreover, in a case where the priority item is the "route certainty", such a travel plan in which an average value of the evaluation values of the route certainty of the other vehicles 101 serving as the leading vehicles is higher is determined that the driver's load is smaller.

The calculation of the driver's load in each of the travel plans does not necessarily have to be performed after the travel plans of all of the sections are decided (for example, in Step S212), and may be performed simultaneously with the processing (the loop of Steps S204 to S209) for deciding the travel plan of each section.

In Step S212 of FIG. 33, the travel plan calculator 13 may output a plurality of the travel plans, and the user may be enabled to select one among these. For example, there is conceived a mode in which the travel plan calculator 13 outputs a predetermined number of the travel plans in order from one in which the driver's load is small, or a mode in which such a travel plan with a smallest driver's load is outputted for each selection item.

Such a travel plan outputted by the travel plan calculator 13 is displayed on the display 24 by the processing of Steps S105 and S106 of FIG. 32. Here, examples of a display mode of the travel plan outputted by the travel plan calculator 13 are shown.

It is conceived to adopt text display as in FIG. 34 as the display mode of the travel plan. A content of the travel plan is displayed by sentences, and accordingly, the text display is effective, for example, in a case of telling the travel plan to a third party by phone and the like.

Moreover, the travel plan may be graphed and displayed as in FIG. 35. As in FIG. 35, the following travel section and the manual driving section are distinguished by using different colors, whereby it becomes easy to grasp the ratio of the following travel section or the manual driving section to the whole of the scheduled travel route. Therefore, an advantage that the user can intuitively recognize the driver's load of the travel plan is obtained.

Moreover, as in FIG. 36, characters and figures, which represent the travel plan, may be superimposed and displayed on a map. In an example of FIG. 36, a line that indicates the scheduled travel route of the subject vehicle 100 (a triangular icon surrounded by a circle) is displayed while distinguishing the following travel section and the manual driving section by using different colors. Moreover, on the map, a current position (a triangular icon) of the other vehicle 101 serving as the leading vehicle and a scheduled travel route thereof are also shown. The travel plan is superimposed and displayed on the map, whereby the content of the travel plan can be represented intuitively and specifically.

Figure 37:
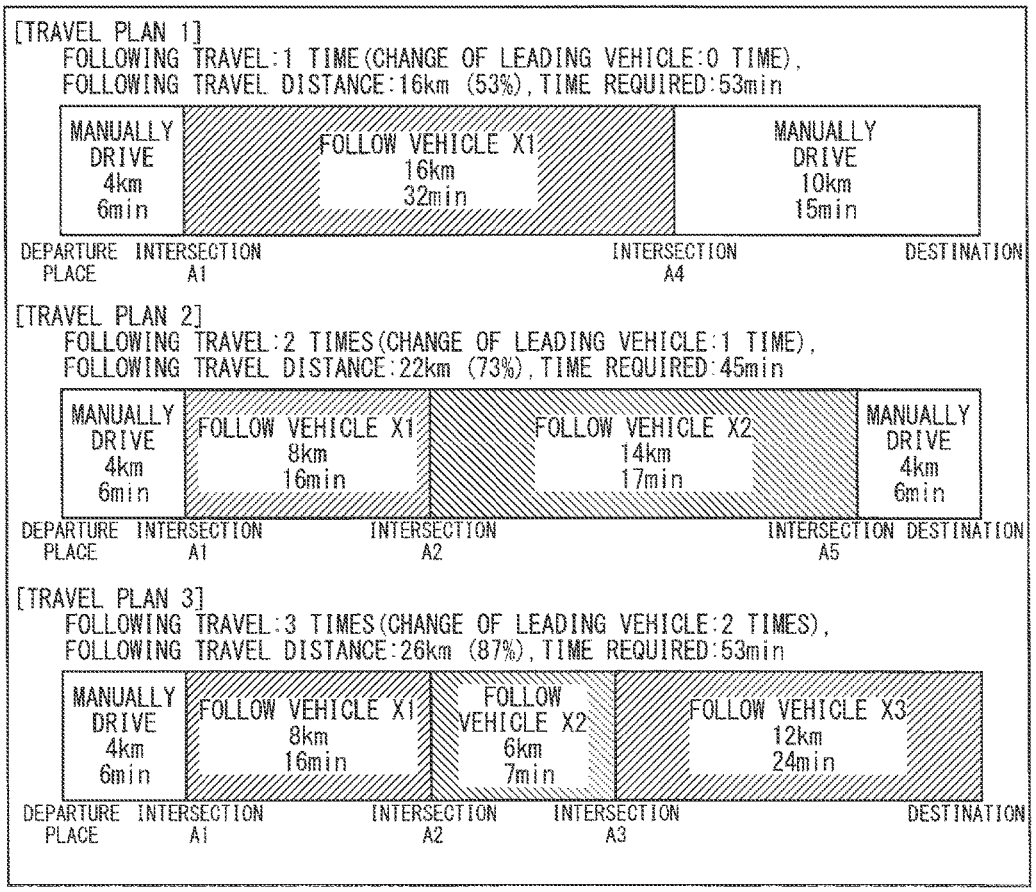
FIG. 37 is a table showing a display example of a plurality of the travel plans.

In a case where the travel plan calculator 13 outputs the plurality of travel plans in Step S212 of FIG. 33, and the user is enabled to select one thereof, then it is recommended to display the plurality of travel plans on the display 24 simultaneously. FIG. 37 is a display example of a case of individually graphing the plurality of travel plans and displaying the graphed travel plans simultaneously. When the travel plans are graphed, the user can intuitively recognize the driver's loads of the travel plans, and accordingly, when the graphed travel plans are displayed line by line, the driver's loads of the respective travel plans can be compared with one another easily. For example, if the user views a screen of FIG. 37, then at a glance, the user can recognize that a travel plan in which the following travel distance is longest is "Travel plan 3", and that a travel plan in which the number of times of changing the leading vehicles is smallest is "Travel plan 1".

In FIG. 37, a length of an axis of abscissas of each graph represents a distance; however, may represent a time. A display mode in which the length of the axis of abscissas of each graph represents a time is effective since it becomes easy to select a travel plan in a case where the driver desires to select such a travel plan in which the following travel time is long, and in a case where the driver desires to select such a travel plan in which the arrival time at the destination is earliest.

Note that, for convenience of the illustration, in the display examples of the travel plans illustrated in this description, the information that indicates the leading vehicle is simply displayed as "following the vehicle X1"; however, in actual, information capable of specifying the leading vehicle more specifically is displayed. It is necessary for the driver to find the leading vehicle by eyes before starting the following travel, and accordingly, it is desired that information capable of specifying the leading vehicle from an appearance thereof, for example, a vehicle type, a vehicle name, a color of a vehicle body, and numbers of a number plate be displayed as the information that indicates the leading vehicle. Moreover, the vehicle type, the vehicle name and the color of the vehicle body may be expressed by using a picture or image of the vehicle.

<Second Embodiment>

Figure 38:
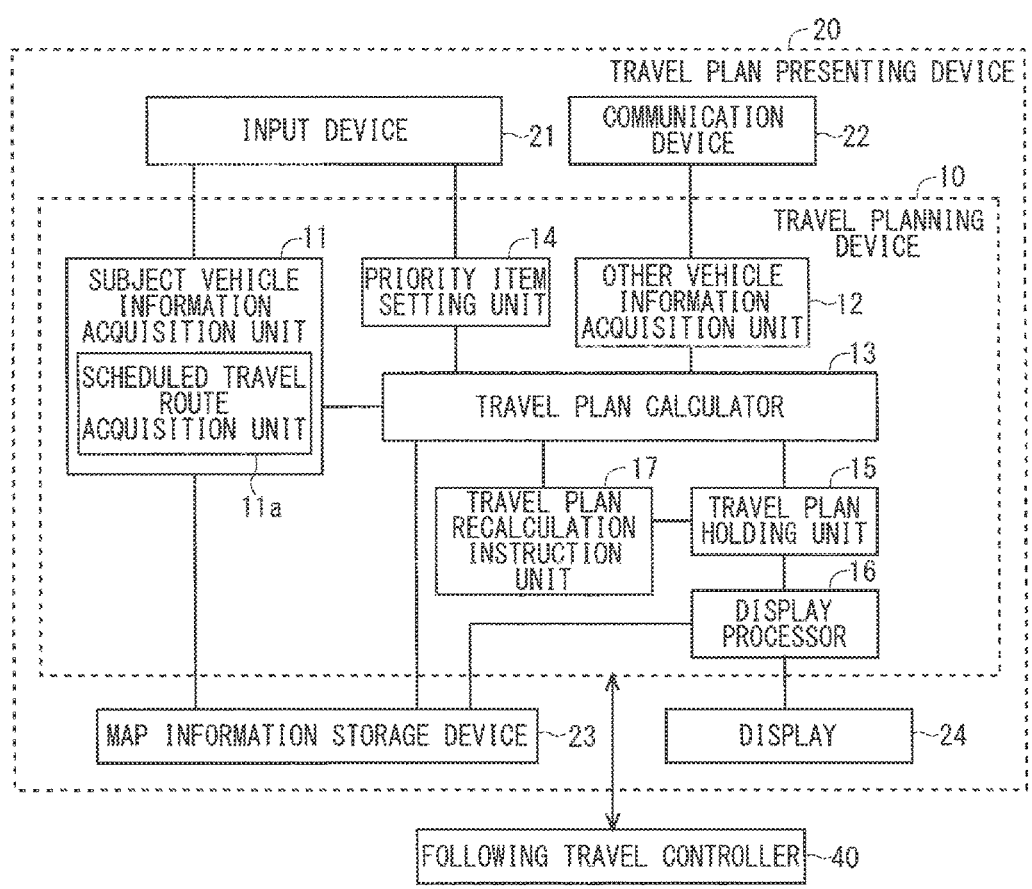
FIG. 38 is a diagram showing a configuration of a travel planning device according to a second embodiment.

FIG. 38 is a diagram showing a configuration of a travel plan presenting device 20 according to a second embodiment. The travel plan presenting device 20 according to the second embodiment has a configuration in which a travel plan recalculation instruction unit 17 is added to the configuration (FIG. 1) of the first embodiment. The travel plan recalculation instruction unit 17 is one that instructs the travel plan calculator 13 to recalculate the travel plan in a case where a predetermined condition is satisfied.

A hardware configuration of the travel plan presenting device 20 of the second embodiment is also basically similar to that of FIG. 5, and in a similar way to the other elements of the travel planning device 10, the travel plan recalculation instruction unit 17 is also realized in such a manner that the processor 51 executes the program stored in the memory 52.

The travel plan recalculation instruction unit 17 of the second embodiment instructs the travel plan calculator 13 to recalculate the travel plan in a case where a fixed time has elapsed from the previous calculation of the travel plan, and in a case where the other vehicle information distributed by the vehicle information server 102 is changed.

Figure 27:
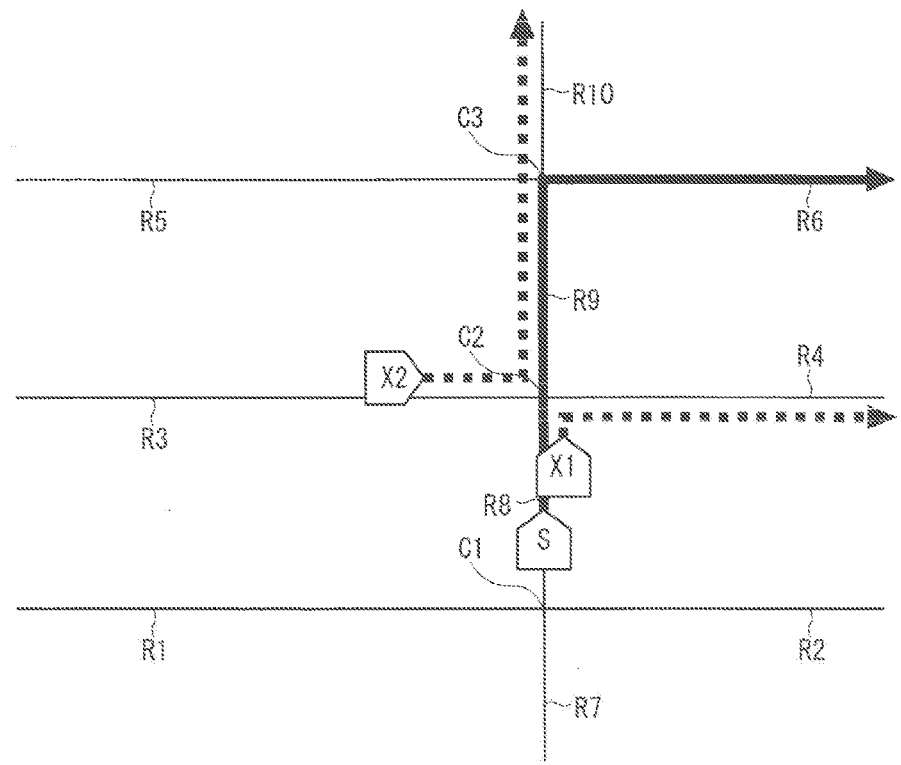
FIG. 27 is a diagram for explaining a relationship between the following travel and the driver's load.
Figure 28:
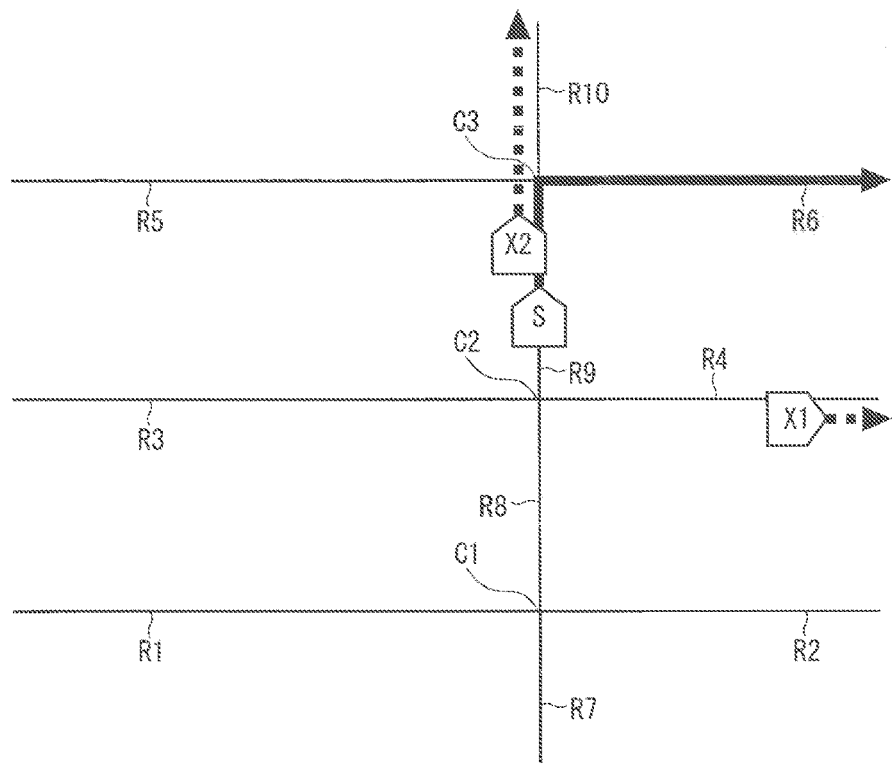
FIG. 28 is a diagram for explaining a relationship between the following travel and the driver's load.
Figure 29:
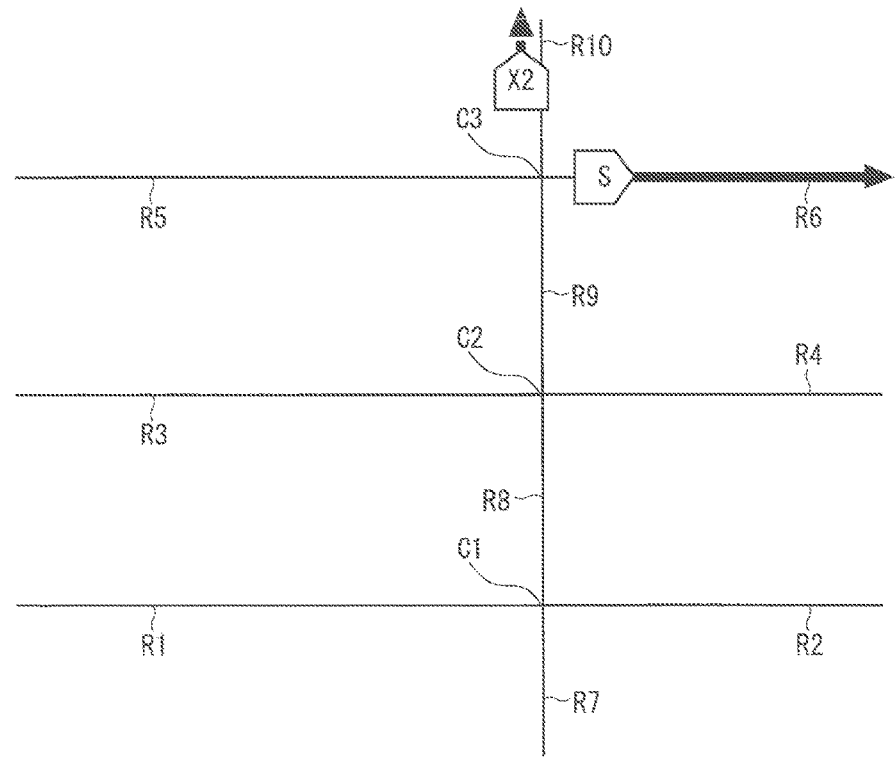
FIG. 29 is a diagram for explaining a relationship between the following travel and the driver's load.
Figure 30:
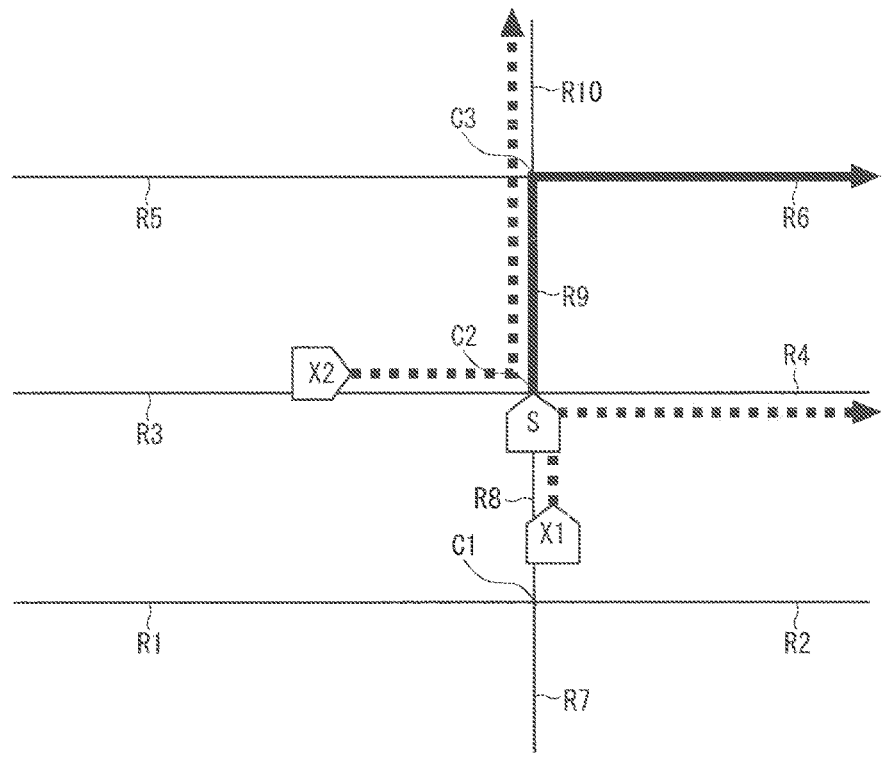
FIG. 30 is a diagram for explaining a relationship between the following travel and the driver's load.
Figure 31:
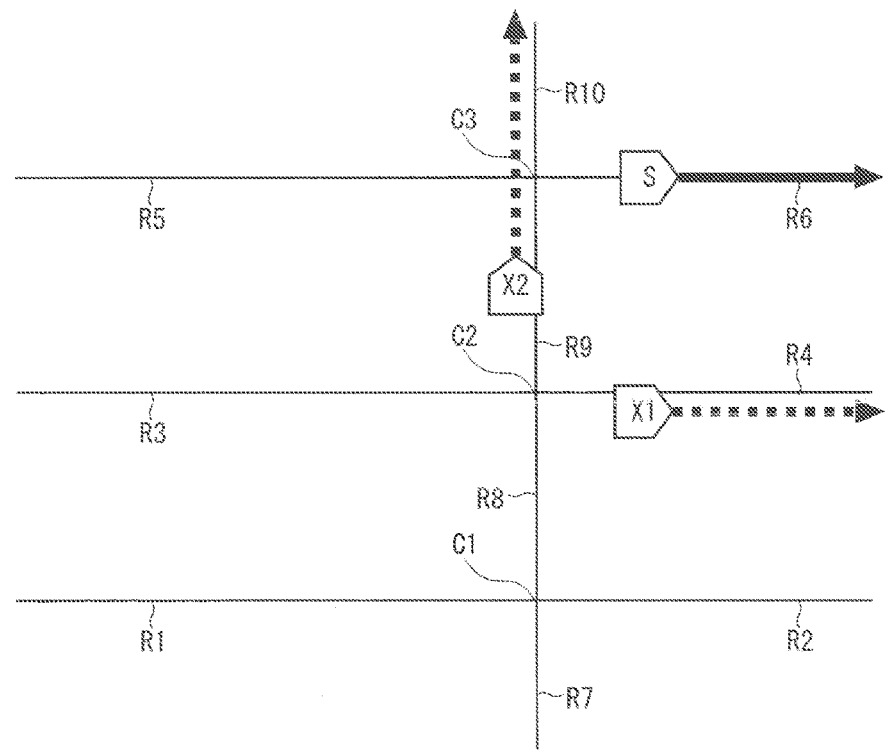
FIG. 31 is a diagram for explaining a relationship between the following travel and the driver's load.

For example, it is assumed that, in the example of FIG. 26, such a travel plan to cause the subject vehicle 100 to follow the other vehicle X1 and the other vehicle X2 is created as in FIG. 27 to FIG. 29 (the following travel section is the roads R8 and R9). After this travel plan is created, in a case where the other vehicle X3 scheduled to travel on the roads R4. R9 and R6 appears as in FIG. 39, if the travel plan is changed so that the subject vehicle S can be caused to follow not the other vehicle X2 but the other vehicle X3 on the road R9, then the subject vehicle S can perform the following travel also on the road R6 as in FIG. 40. In this way, the following travel distance is lengthened, and accordingly, the driver's load can be reduced (in the case where the priority item is the "length of following travel distance"). The travel plan recalculation instruction unit 17 is one that enables such a change of the travel plan.

If the recalculated travel plan is one that can reduce the driver's load more than the current travel plan, then it is desirable to change the travel plan. Moreover, even if the recalculated travel plan is one in which the driver's load is increased more than in the current travel plan, if the current travel plan is in an unusable state, the travel plan cannot help being changed to the recalculated one. However, even in such a case, it is not preferable to change the travel plan without obtaining an approval of the user.

Figure 41:
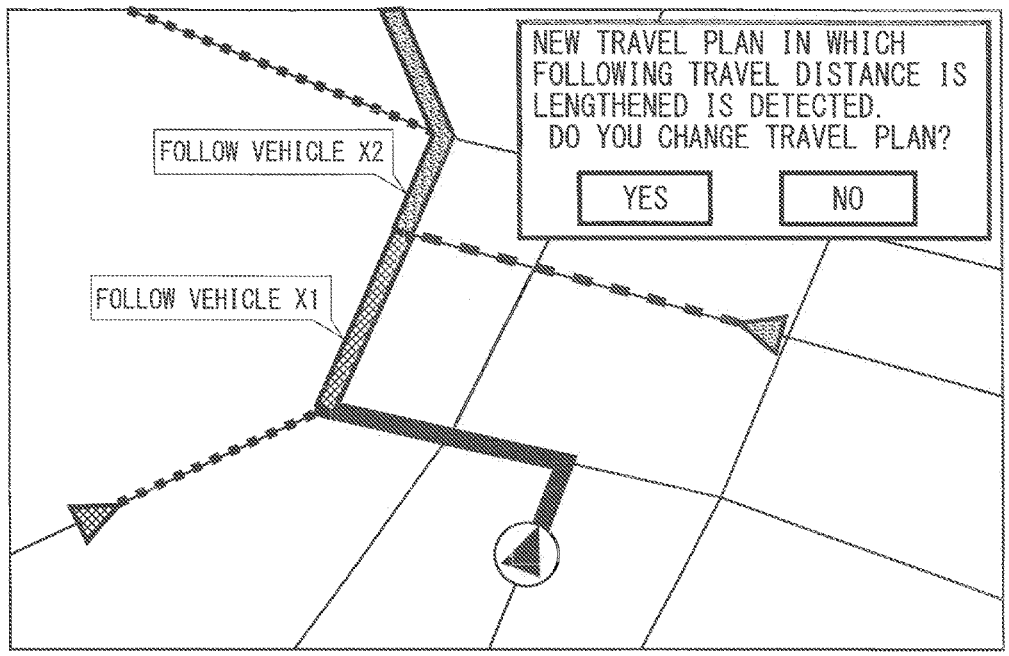
FIG. 41 is a diagram showing an example of a travel plan selection screen.

In this connection, in a case where the travel plan that can reduce the driver's load more than the current travel plan is obtained by the recalculation in a state where the current travel plan is usable, the display processor 16 displays a screen (travel plan selection screen), which urges the driver to select which of the travel plans should be adopted, on the display 24 as in FIG. 41. In the travel plan selection screen of FIG. 41, text and icons, which urge the driver to select whether or not to change the travel plan, and the recalculated travel plan are superimposed and displayed on the map.

Figure 42:
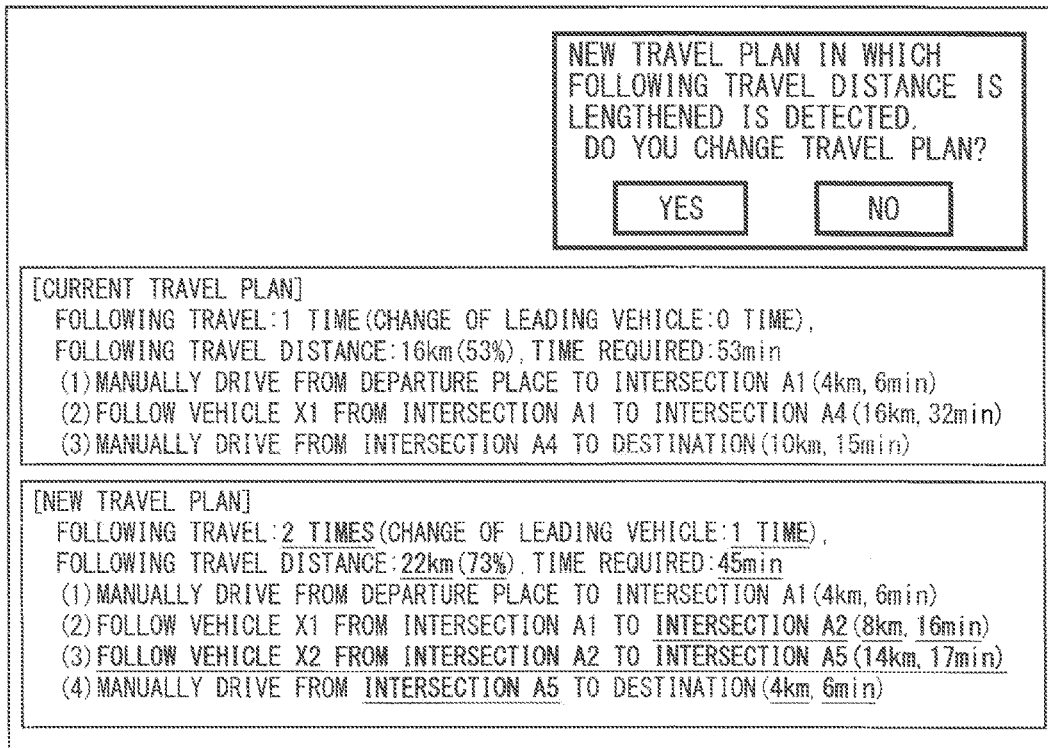
FIG. 42 is a table showing an example of the travel plan selection screen.
Figure 43:
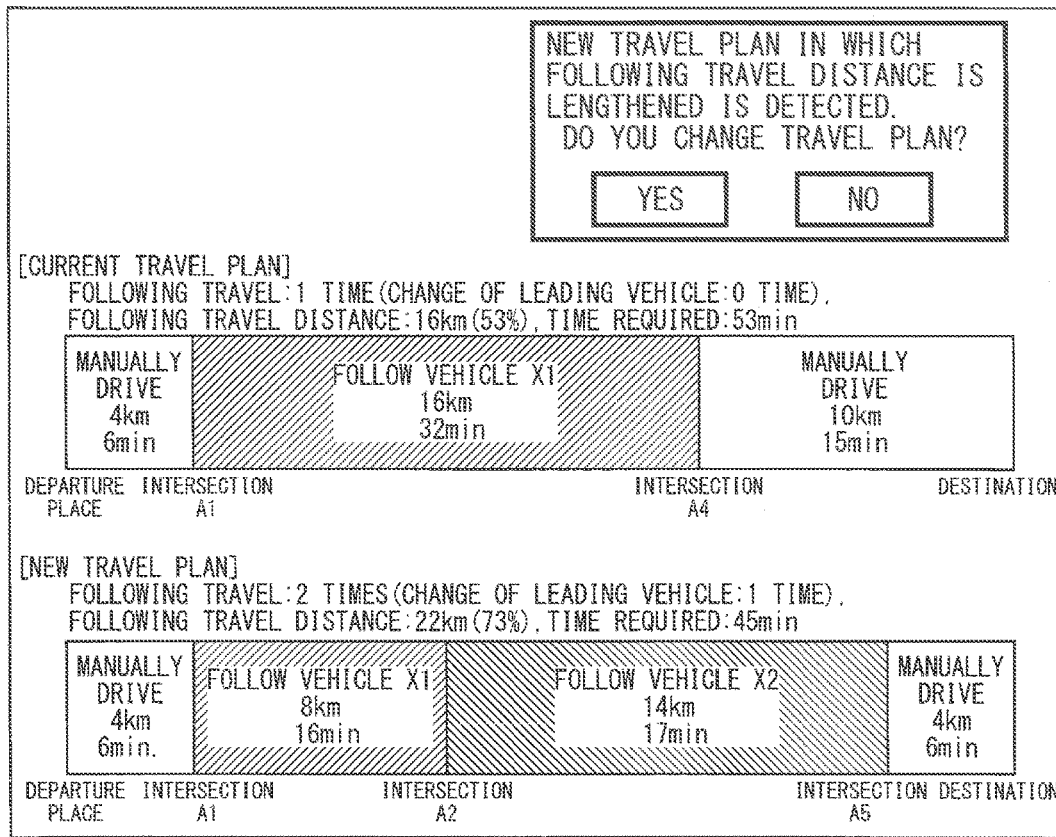
FIG. 43 is a table showing an example of the travel plan selection screen.

On the travel plan selection screen, as in FIG. 42, text that represents the current travel plan and text that represents the recalculated new travel plan may be displayed line by line. Alternatively, as in FIG. 43, on the travel plan selection screen, a graph that represents the current travel plan and a graph that represents the recalculated new travel plan may be displayed line by line. If both of the current travel plan and the recalculated travel plan are displayed on the travel plan selection screen as in FIG. 42 and FIG. 43, then the user can easily compare both with each other.

Figure 44:
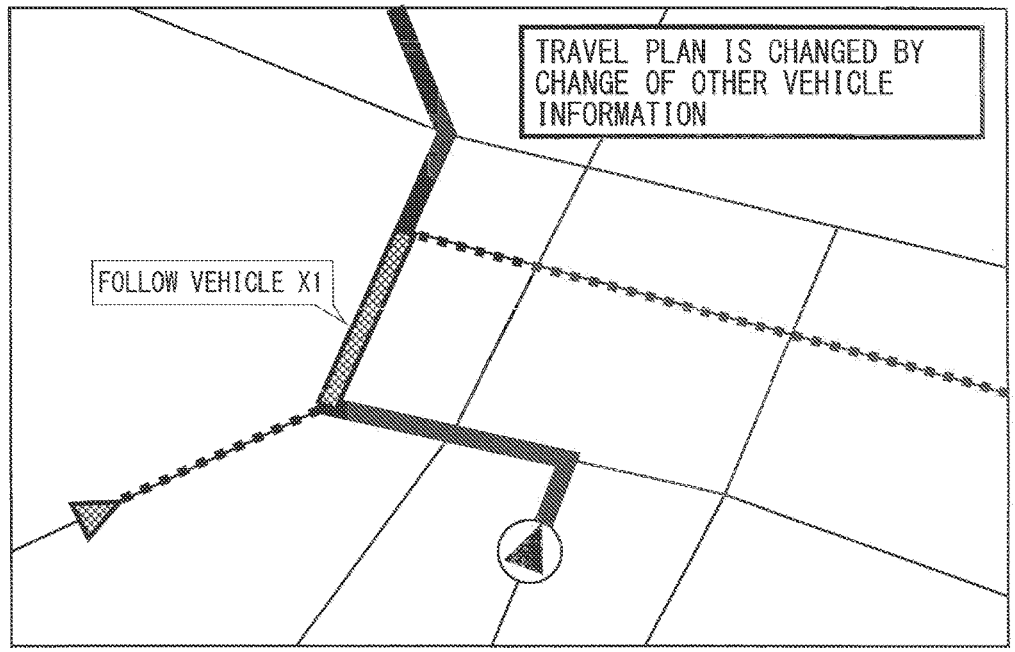
FIG. 44 is a diagram showing an example of a travel plan change notification screen.

Moreover, in a case where the travel plan is recalculated in the state where the current travel plan is unusable, the travel plan is automatically changed no matter whether or riot the driver's load can be reduced, and as in FIG. 44, a screen (travel plan change notification screen) that issues a notice on a message thereof is displayed. On the travel plan change notification screen of FIG. 44, the changed travel plan (the recalculated travel plan) and text of the message telling that the travel plan is changed are superimposed and displayed on the map. Though not shown, those in which the changed travel plan is represented by text and a graph may be displayed on the travel plan change notification screen.

Figure 45:
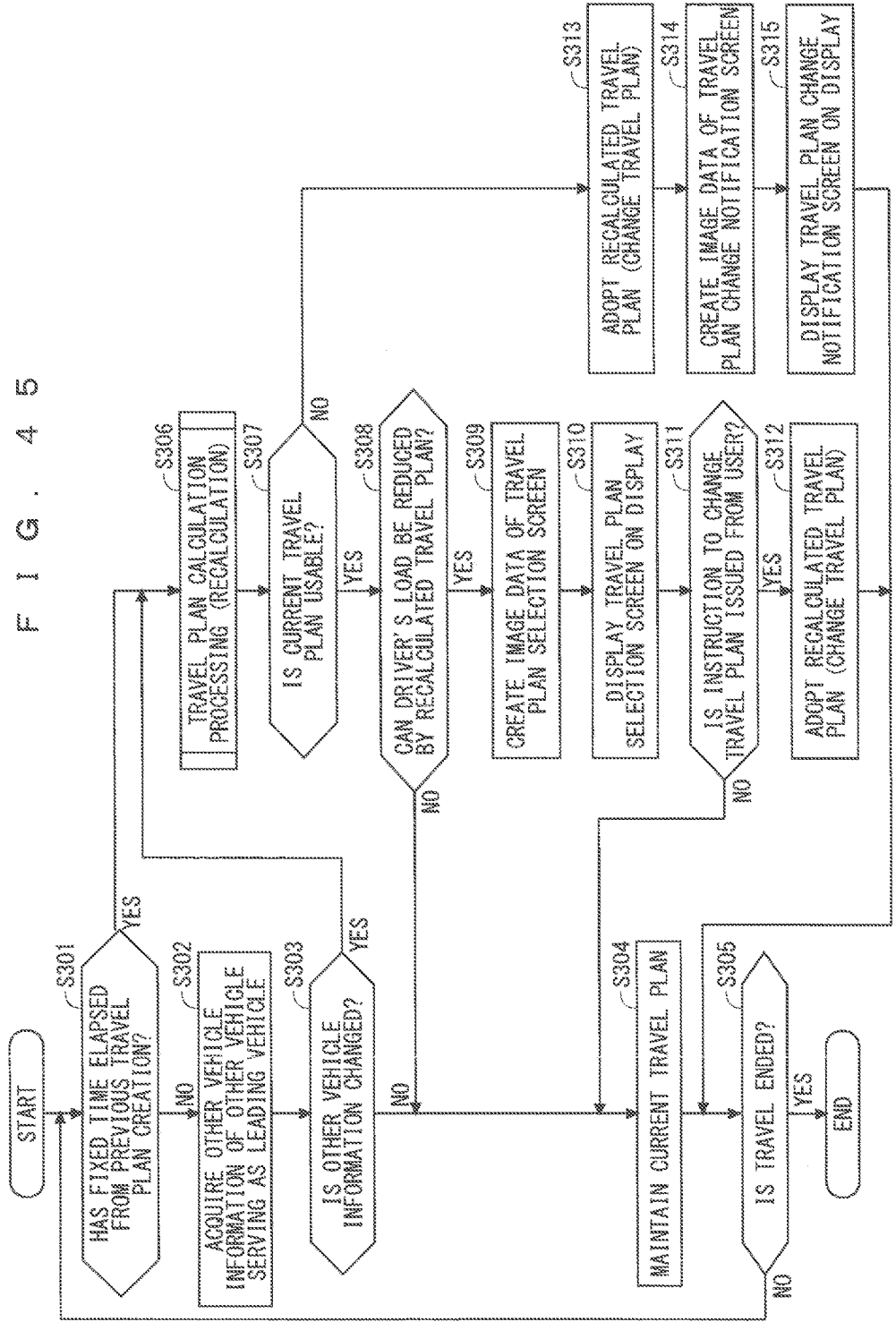
FIG. 45 is a flowchart showing travel plan recalculation processing in the second embodiment.

Next, a description will be made of processing (travel plan recalculation processing) for recalculating the travel plan in the travel planning device 10 according to the second embodiment. FIG. 45 is a flowchart showing the processing.

The travel plan recalculation instruction unit 17 confirms whether or not a fixed time has elapsed from the previous travel plan creation (Step S301). In a case where the fixed time has elapsed from the previous travel plan creation (YES in Step S301), the travel plan recalculation instruction unit 17 causes the travel plan calculator 13 to perform the travel plan calculation processing, and to recalculate the travel plan (Step S306). The travel plan calculation processing of Step S306 may be the same as that shown in FIG. 33.

In a case where the fixed time has not elapsed from the previous travel plan creation (NO in Step S301), the travel plan recalculation instruction unit 17 acquires, via the communication device 22, the other vehicle information of the other vehicle 101 serving as the leading vehicle for the subject vehicle 100 (Step S302), and confirms whether or not the other vehicle information concerned is changed (Step S303). Also in a case where the other vehicle information concerned is changed (YES in Step S303), the travel plan recalculation instruction unit 17 causes the travel plan calculator 13 to recalculate the travel plan (Step S306).

Note that, in a case where the fixed time has not elapsed from the previous travel plan creation, and the other vehicle information is not changed, either (NO in Step S303), the recalculation of the travel plan is not performed, and the current travel plan is maintained (Step S304). That is, the travel plan stored in the travel plan holding unit 15 is maintained.

When the travel plan calculation processing of Step S306 is completed, and the recalculated travel plan is obtained, the travel plan recalculation instruction unit 17 confirms whether or not the current travel plan is usable (Step S307). In a case where a large change (a change to an extent where the current travel route cannot be maintained) occurs in the other vehicle information of the other vehicle 101, which contributes to the current travel plan, the current travel plan becomes unusable. This determination can be performed by confirming whether or not the same travel plan as the current travel plan is stored in the already calculated travel plan aggregate RF in a case of the travel plan calculation processing of Step S306.

In a case where the current travel plan is usable (YES in Step S307), it is confirmed whether or not the driver's load can be reduced by the recalculated travel plan (Step S308). That is, it is confirmed whether or not the driver's load of the recalculated travel plan is smaller than the driver's load of the current travel plan. In a case where the driver's load cannot be reduced by the recalculated travel plan (NO in Step S308), the current travel plan is maintained (Step S304).

In a case where the driver's load can be reduced by the recalculated travel plan (YES in Step S308), image data of such a travel plan selection screen as in FIG. 41 is created (Step S309), and the travel plan selection screen is displayed on the display 24 (Step S310). Then, if the instruction to change the travel plan is issued from the user (YES in Step S311), then the recalculated travel plan is adopted. That is, the travel plan held in the travel plan holding unit 15 is changed from the current one to the recalculated one (Step S312).

Note that, if the instruction to change the travel plan is not obtained from the user (NO in Step S311), the current travel plan is maintained (Step S304).

Meanwhile, in a case where the current travel plan is not usable (NO in Step S307), the recalculated travel plan is automatically adopted (Step S313), image data of such a travel plan change notification screen as in FIG. 44 is created (Step S314), and the travel plan change notification screen is displayed on the display 24 (Step S315).

After the processing described above, it is confirmed whether or not the travel of the subject vehicle 100 is ended (Step S305). If the user inputs a message of the above, or the travel planning device 10 can confirm that a current location of the subject vehicle 100 is the destination, then it is determined that the travel of the subject vehicle 100 is ended (YES in Step S305), and the travel plan recalculation processing is ended. If the travel of the subject vehicle 100 is not ended, then the processing described above is executed repeatedly until the travel is ended.

Moreover, as the case where the current travel plan is not usable, there are conceived: a case where the travel plan of the scheduled leading vehicle is changed; a case where the travel as planned in the travel plan becomes impossible due to a traffic failure such as a traffic jam; and the like, Moreover, in a case where a vehicle that has an advantageous following condition (a condition that meets the priority item) is newly found by an inter-vehicle communication the like, processing (recalculation and display thereof) for changing the following travel plan so as to follow the found vehicle may be performed.

<Third Embodiment>

Figure 46:
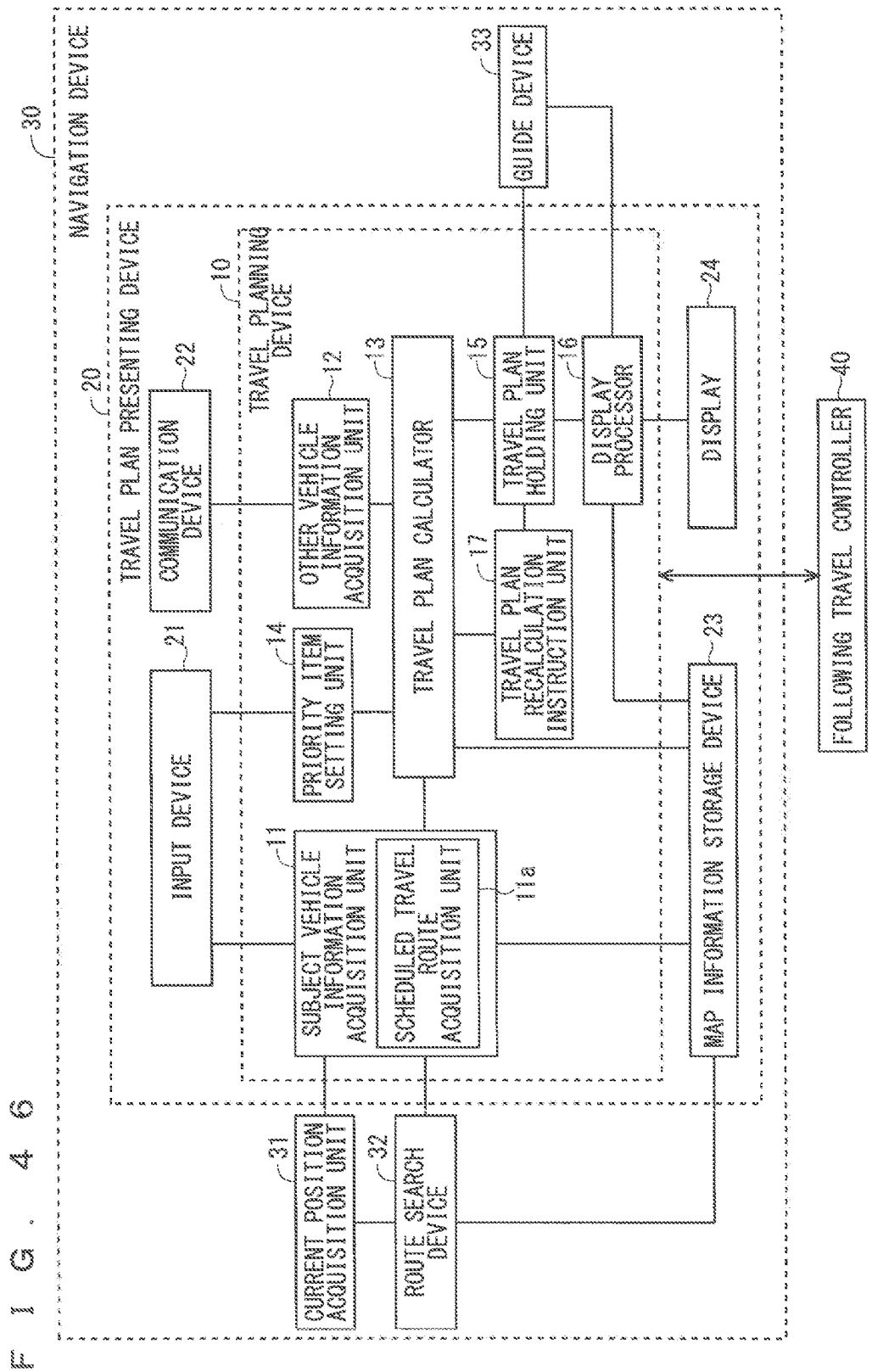
FIG. 46 is a diagram showing a configuration of a navigation device according to a third embodiment.

In a third embodiment, the travel plan presenting device 20 according to the present invention is applied to a navigation device. FIG. 46 is a diagram showing a configuration of a navigation device 30 according to the third embodiment. The navigation device 30 has a configuration in which a current position acquisition unit 31, a route search device 32 and a guide device 33 are added to the travel plan presenting device 20 of FIG. 38.

A hardware configuration of the navigation device 30 is basically similar to that of FIG. 5, and in a similar way to the respective elements of the travel planning device 10, the current position acquisition unit 31, the route search device 32 and the guide device 33 are also realized in such a manner that the processor 51 executes the program stored in the memory 52.

FIG. 47 is a diagram showing a configuration of a vehicle information distribution system according to the third embodiment. The vehicle information distribution system concerned is substantially the same as that of FIG. 2; however, has a configuration in which the navigation device 30 including the travel plan presenting device 20 is mounted on the subject vehicle 100. The navigation device 30 does not have to be one provided permanently in the subject vehicle 100, and for example, may be a portable navigation device capable of being carried into the subject vehicle 100.

The current position acquisition unit 31 of the navigation device 30 is one that calculates the current location of the navigation device 30 from position information, and the like acquired from a global positioning system (GPS) or the like.

The route search device 32 is one that searches for an optimum route from the departure place set by the user to the destination set thereby. In usual, the current location acquired by the current position acquisition unit 31 is automatically set as the departure place, and accordingly, the user can obtain the route (the scheduled travel route of the subject vehicle 100) from the current location to the destination by only inputting the destination. In this embodiment, it is defined that the scheduled travel route acquisition unit 11a, which the subject vehicle information acquisition unit 11 includes, acquires the scheduled travel route of the subject vehicle 100, which is calculated by the route search device 32.

The guide device 33 is one that provides guide information to the driver so that the subject vehicle 100 can be traveled in accordance with the travel plan (the travel plan stored in the travel plan holding unit 15) created by the travel planning device 10. The guide device 33 does not only gives guidance of the scheduled travel route like a conventional navigation device, but also, so that the subject vehicle 100 can perform the following travel as planned in the travel plan, guides the subject vehicle 100 to a position of the leading vehicle, or guides the subject vehicle 100 to the waiting-enabled point (a service area or the like) in order to make the subject vehicle S wait for the leading vehicle.

For example, in a case where the subject vehicle 100 enters the following travel section by manual driving, the guide device 33 acquires the position of the leading vehicle (the other vehicle 101) by the inter-vehicle communication using the communication device 22. Then, based on a positional relationship between the subject vehicle 100 and the leading vehicle, the guide device 33 guides the subject vehicle 100 to such a position where the subject vehicle 100 is capable of following the leading vehicle, For example, it is recommended to display the positions of the subject vehicle 100 and the leading vehicle on the map displayed on the display 24, and to enlarge and display the positional relationship between the subject vehicle 100 and the leading vehicle as in FIG. 48 when the subject vehicle 100 approaches the leading vehicle to some extent. In this case, it is more preferable if an area (a following-enabled area) where the subject vehicle 100 is capable of starting the following travel is shown.

Moreover, in FIG. 48, an example is shown where an image showing the positional relationship between the subject vehicle 100 and the leading vehicle is an image created by a central processing unit (CPU) and a graphics processing unit (GPU), which are included in the processor 51 of FIG. 5; however, in place of this, a video in front of the subject vehicle 100, which is taken, for example, by a camera mounted on the subject vehicle 100, may be used. In that case, it is recommended to synthesize an area, which shows the following-enabled area, with the video in front of the subject vehicle 100, and to display the synthesized image and video. Moreover, the following-enabled area may be displayed on a driver's viewing field by using a head-up display. Note that the head-up display is a display device that directly displays an image on the driver's viewing field in such a manner that the driver displays the image on a screen (for example, a windshield) through which the driver can view the front.

Note that, also in this embodiment, the travel planning device 10 performs communication with the following travel controller 40, and transmits the following travel instruction, which accords with the travel plan, to the following travel controller 40. The following travel controller 40 controls a control system (not shown) of the subject vehicle 100 based on the following travel instruction, and causes the subject vehicle 100 to follow such preceding vehicles to be followed. Moreover, when the subject vehicle 100 travels in the section (manual driving section) in which the manual driving is planned, the following travel controller 40 urges the subject vehicle 100 to perform a constant-speed drive, and urges the user to perform the manual driving of the subject vehicle 100.

Moreover, the guide information created by the guide device 33 may be outputted as a voice message from a speaker or the like in the subject vehicle 100 as well as be displayed on the display 24. For example, in a case of shifting from the manual driving to the following travel, in a case of changing the leading vehicle during the following travel, it is recommended to output a voice message saying "Please move to the position where automatic following is possible", and to urge the user to cause the subject vehicle 100 to follow the leading vehicle. Moreover, together with such a display as in FIG. 48, a voice message saying "Please move to the following-enabled area. Following travel starts when you enter the following-enabled area" may be outputted.

Here, the following-enabled area depends on performance of the following travel controller 40, typically on a following-enabled inter-vehicle distance. The performance of the following travel controller 40 may be pre-stored in the travel planning device 10, or may be acquired by the travel planning device 10 by communication with the following travel controller 40. In a case of the latter method, dynamic performance of the following travel controller 40, which corresponds to a travel environment such as weather, brightness and a time, can be reflected, and the travel planning device 10 can display a more accurate following-enabled area on the display 24.

Moreover, in the example of FIG. 48, special display effects may be imparted to the image of the leading vehicle. For example, it is recommended to display the current and future leading vehicles so that each thereof can be identified in such a manner that the image of the leading vehicle being followed at present is surrounded by a frame of a blue solid line, then in the case of changing the leading vehicle, the frame of the image of the leading vehicle being followed at present is changed to a yellow broken line, and a vehicle to be newly followed is surrounded by a blue broken line, and after the change of the leading vehicles is completed, the new leading vehicle is surrounded by a blue solid line. Moreover, in a case where the new leading vehicle as such a change target is not found even if it becomes difficult to follow the current leading vehicle, a frame of a red broken line may be added to the image of the current leading vehicle.

Timing of imparting the special display effects as described above may be limited to only a fixed period before or after changing the leading vehicles. Moreover, the special display effects as described above may also be applied to a case of displaying a video in front of the subject vehicle 100, which is taken by a camera, on the display 24, and a case of using the head-up display. Moreover, the special display effects are not limited to the display of the frames, and may be effects using other figures, characters and the like.

Moreover, for example, in a case of waiting for the leading vehicle at the waiting-enabled point, it is recommended to guide the subject vehicle 100 to the waiting-enabled point by a voice message saying "Wait for the leading vehicle. Enter the service area. The leading vehicle will arrive in about 10 minutes.", and then to urge the subject vehicle 100 to depart by a voice message saying "The leading vehicle is approaching. Start to travel." when the leading vehicle approaches thereafter.

Figure 49:
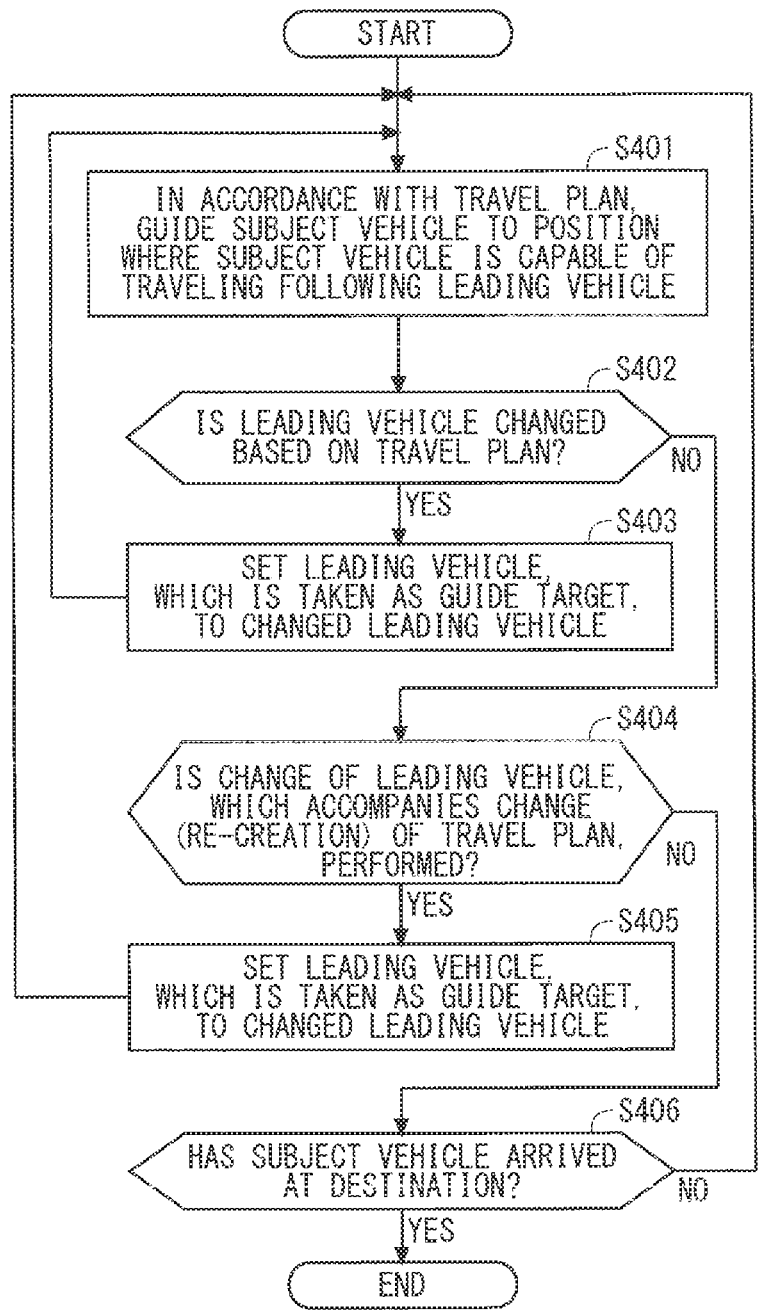
FIG. 49 is a flowchart showing operations of the navigation device according to the third embodiment in a following travel section.

Here, a description will be made of operations of the guide device 33 of the navigation device 30 when the subject vehicle 100 travels on the following travel section. FIG. 49 is a flowchart showing the operations. Note that operations of the guide device 33 when the subject vehicle 100 travels on the manual driving section may be the same as those of a general navigation device, and accordingly, a description thereof is omitted here.

When the subject vehicle 100 is traveling on the following travel section, then in accordance with the travel plan, the guide device 33 guides the subject vehicle 100 to the position where the subject vehicle 100 is capable of traveling following the other vehicle 101 that is the leading vehicle in the section concerned (Step S401) (This guide is unnecessary if the subject vehicle 100 already follows the leading vehicle as planned in the travel plan).

Then, the guide device 33 confirms whether or not the leading vehicle is changed based on the travel plan (Step S402). If the leading vehicle is changed (YES in Step S402), the guide device 33 sets the leading vehicle, which is taken as a guide target, to the changed leading vehicle (Step S403), and returns to Step S401.

Moreover, if such a change of the leading vehicle, which is based on the travel plan, is not performed (NO in Step S402), the guide device 33 confirms whether or not the change of the leading vehicle, which accompanies the change (re-creation) of the travel plan, is performed (Step S404). If the change of the leading vehicle, which accompanies the change of the travel plan, is performed (YES in Step S404), the guide device 33 sets the leading vehicle, which is taken as the guide target, to the changed leading vehicle (Step S405), and returns to Step S401.

Moreover, if neither such a change of the leading vehicle, which is based on the travel plan, nor the change of the leading vehicle, which accompanies the change of the travel plan, is performed (NO in Step S404), the guide device 33 confirms whether or not the subject vehicle 100 has arrived at the destination (Step S406). If the subject vehicle 100 has arrived at the destination (YES in Step S406), the guide device 33 ends the guide processing. If the subject vehicle 100 has not arrived at the destination (NO in Step S406), the operation returns to Step S401.

By the processing described above, the guide device 33 can always grasp the leading vehicle, which is taken as the guide target.

Next, a description will be made of the travel plan recalculation processing performed by the travel planning device 10 of the navigation device 30 according to the third embodiment. FIG. 50 is a flowchart of the travel plan recalculation processing. A flow of FIG. 50 is basically the same as the flow shown in FIG. 45; however, in comparison with the flow of FIG. 45, a condition of executing the travel plan calculation processing (Step S306) for recalculating the travel plan is increased.

That is, in the flow of FIG. 45, Step S306 is executed in the case where the fixed time has elapsed from the previous travel plan creation and in the case where the other vehicle information of the other vehicle 101 serving as the leading vehicle is changed; however, in the flow of FIG. 50, Step S306 is also executed further in a case described below. Others than the above in the flow are similar to those in FIG. 45, and accordingly, a description thereof is omitted here.

In the flow of FIG. 50, the travel plan recalculation instruction unit 17 acquires the position (subject vehicle position) of the subject vehicle 100 from the current position acquisition unit 31 (Step S351), and also in a case where the position of the subject vehicle 100 or a variation thereof (that is, a travel distance of the subject vehicle 100) satisfies a predetermined condition (YES in Step S352), Step S306 is executed. The "predetermined condition" in Step S352 is, for example, a case where the subject vehicle 100 advances by a fixed distance, a case where the subject vehicle 100 passes through a predetermined point (for example, a point such as an intersection and a service area, which has a specific attribute, such a division point determined in a case of creating the travel plan (Step S201 of FIG. 33)), a case where the subject vehicle 100 does an action different from that in the travel plan, and the like.

Moreover, also in a case where it is detected that the leading vehicle being followed at present does an action different from that in the vehicle information thereof (the other vehicle information) by the inter-vehicle communication made via the communication device 22 (YES in Step S353), the travel plan calculation processing of Step S306 is executed. The action different from that in the other vehicle information is, for example, traveling on a route different from the scheduled travel route, passing through each point at a time largely deviated from the scheduled passage time, and the like.

Note that, in the present invention, within the scope of the present invention, it is possible to freely combine the respective embodiments, and to appropriately modify and omit the respective embodiments.

Although the description has been made of the present invention in detail, the above description is an illustration in all aspects, and the present invention is not limited to this. It is interpreted that unillustrated countless modification examples are imaginable without departing from the scope of the present invention.

REFERENCE SIGNS LIST

10: travel planning device
11: subject vehicle information acquisition unit
11*a*: scheduled travel route acquisition unit
12: other vehicle information acquisition unit
13: travel plan calculator
14: priority item setting unit
15: travel plan holding unit
16: display processor
17: travel plan recalculation instruction unit
20: travel plan presenting device
21: input device
22: communication device
23: map information storage device
24: display
30: navigation device
31: current position acquisition unit
32: route search device
33: guide device
51: processor
52: memory
53: input/output interface
100: subject vehicle
101: other vehicle
102: vehicle information server
103: enterprise

The invention claimed is:

1. A travel planning device comprising:
a processor that executes a program; and
a storage device that stores said program,
wherein, when said program is executed by said processor, the travel planning device
acquires subject vehicle information including a scheduled travel route and scheduled departure time of a subject vehicle,
acquires other vehicle information including information which is used to predict scheduled travel routes of a plurality of other vehicles and a scheduled passage time through each point on the scheduled travel routes,
divides the scheduled travel route of said subject vehicle into a plurality of sections,
decides, which of a manual driving section where said subject vehicle is caused to travel by manual driving and a following travel section where said subject vehicle is caused to travel following a leading vehicle each of the sections of the scheduled travel route of said subject vehicle is to be defined as, based on said subject vehicle information, said other vehicle information and travel plans of said subject vehicle and other vehicles in a section just before each of the sections,
selects other vehicle, which serves as the leading vehicle in each following travel section, from among the plurality of other vehicles for each following travel section based on said subject vehicle information, said other vehicle information and said travel plans of said subject vehicle and other vehicles in a section just before each of the sections, and
outputs for display on a display device a travel plan including information that indicates whether each section of the scheduled travel route of said subject vehicle is the manual driving section or the following travel section, and information that indicates the other vehicle that serves as the leading vehicle in each following travel section.

2. The travel planning device according to claim 1, wherein
the leading vehicle of each following travel section in said travel plan is selected so that a predicted time since said subject vehicle enters the following travel section until the subject vehicle joins the leading vehicle can become smaller than a predetermined value.

3. The travel planning device according to claim 1, wherein,
in a case where it is predicted that said subject vehicle arrives at the following travel section prior to the leading vehicle, a period while the subject vehicle waits for the leading vehicle in front of the following travel section or a midway point of the following travel section is included in said travel plan.

4. The travel planning device according to claim 1, wherein
a magnitude of a driver's load from said travel plan is evaluated based on one or more priority items, and said travel plan in which said driver's load becomes minimum is calculated.

5. The travel planning device according to claim 4, wherein
said priority items are those selected by a user from a plurality of predetermined items.

6. The travel planning device according to claim 5, wherein
each of said plurality of items is any of a length of a following travel distance, an arrival time at a destination, a length of a following travel time, a number of times of changing the leading vehicle, a driving evaluation value of the leading vehicle, and route certainty of the leading vehicle.

7. The travel planning device according to claim 1, wherein
a travel plan is calculated in which a number of times that said subject vehicle changes as the leading vehicle is smallest.

8. The travel planning device according to claim 1, wherein
a travel plan is calculated in which a ratio of the distance of the following travel section to the distance of the scheduled travel route of said subject vehicle is largest.

9. The travel planning device according to claim 1, wherein
a travel plan in which a ratio of a travel time of the following travel sections to a travel time of the scheduled travel route of said subject vehicle becomes maximum is calculated.

10. The travel planning device according to claim 1, wherein
said subject vehicle information further includes attached subject vehicle information including at least one of performance of said subject vehicle and a condition of a vehicle permitted to lead said subject vehicle in determination of said leading vehicle, and
the leading vehicle of each following travel section is selected in consideration of said attached subject vehicle information.

11. The travel planning device according to claim 1, wherein
said other vehicle information further includes attached other vehicle information including at least one of driving evaluation values, route certainties, expected speeds and conditions of vehicles permitted to follow in said plurality of other vehicles in determination of a following vehicle, and
the leading vehicle of each following travel section is selected in consideration of said attached other vehicle information.

12. The travel planning device according to claim 1, wherein
said travel plan is displayed on a display.

13. The travel planning device according to claim 12, wherein
a route that represents said travel plan is superimposed on a map that indicates the scheduled travel route of said subject vehicle, and is displayed on said display.

14. The travel planning device according to claim 1, wherein
said travel plan is recalculated in a case where a predetermined condition is satisfied.

15. The travel planning device according to claim 14, wherein
the condition for recalculating said travel plan is any of
(a) a case where a fixed time has elapsed,
(b) a case where said subject vehicle has traveled by a fixed distance,
(c) a case where said subject vehicle has passed through a predetermined point,
(d) a case where said subject vehicle has done an action different from said travel plan,
(e) a case where it is sensed that said other vehicle information of said other vehicle that serves as the leading vehicle is changed, and
(f) a case where said other vehicle that serves as the leading vehicle has done an action different from said other vehicle information.

16. A travel planning method comprising:
acquiring subject vehicle information including a scheduled travel route and scheduled departure time of a subject vehicle,
acquiring other vehicle information including information which is used to predict scheduled travel routes of a plurality of other vehicles and a scheduled passage time through each point on the scheduled travel routes,
dividing the scheduled travel route of said subject vehicle into a plurality of sections,
deciding which of a manual driving section where said subject vehicle is caused to travel by manual driving and a following travel section where said subject vehicle is caused to travel following a leading vehicle each of the sections of the scheduled travel route of said subject vehicle is to be defined as, based on said subject vehicle information and said other vehicle information and travel plans of said subject vehicle and other vehicles in a section just before each of the sections,
selecting other vehicle, which serves as the leading vehicle in each following travel section, from among said plurality of other vehicles for each following travel section based on said subject vehicle information, said other vehicle information and said travel plans of said subject vehicle and other vehicles in a section just before each of the sections, and
outputting to a display for display a travel plan including information that indicates whether each section of the scheduled travel route of said subject vehicle is the manual driving section or the following travel section, and information that indicates the other vehicle that serves as the leading vehicle in each following travel section.

* * * * *